United States Patent
Matsuo et al.

(10) Patent No.: US 7,443,843 B2
(45) Date of Patent: Oct. 28, 2008

(54) TERMINAL RELAY DEVICE AND RELAY METHOD

(75) Inventors: Hiroyuki Matsuo, Yokohama (JP); Mitsuhiro Kawaguchi, Kawasaki (JP); Shosaku Yamasaki, Yokohama (JP); Takashi Umegaki, Yokohama (JP); Koji Komatsu, Yokohama (JP); Yoshimasa Itsuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 11/100,335

(22) Filed: Apr. 6, 2005

(65) Prior Publication Data

US 2005/0195864 A1   Sep. 8, 2005

Related U.S. Application Data

(63) Continuation of application No. PCT/JP03/04011, filed on Mar. 28, 2003.

(51) Int. Cl.
*H04Q 11/00* (2006.01)

(52) U.S. Cl. .................. 370/386; 370/218; 370/227; 370/235; 370/376; 370/388; 370/401; 370/535; 370/537; 370/542; 398/2; 398/5; 398/63; 398/154

(58) Field of Classification Search .................. 370/218, 370/376, 401, 535, 537, 542, 225–288; 398/2, 398/5, 83, 154
See application file for complete search history.

(56) References Cited

U.S. PATENT DOCUMENTS

| | | | |
|---|---|---|---|
| 6,614,754 | B1 | 9/2003 | Usuba et al. |
| 7,016,379 | B2 * | 3/2006 | Falkenstein et al. ......... 370/535 |
| 2004/0052520 | A1 * | 3/2004 | Halgren et al. ................. 398/5 |

FOREIGN PATENT DOCUMENTS

| | | |
|---|---|---|
| JP | 10-303899 | 11/1998 |
| JP | 11-313096 | 11/1999 |
| JP | 2001-217752 | 8/2001 |
| JP | 2001-223728 | 8/2001 |

* cited by examiner

*Primary Examiner*—Seema S. Rao
*Assistant Examiner*—Wanda Z Russell
(74) *Attorney, Agent, or Firm*—Katten Muchin Rosenman LLP

(57) ABSTRACT

An apparatus has a cross connection circuit, first switching sections located on the input side of the cross connection circuit to switch a presently-used transmission path and a reserve transmission path, and second switching sections located on the output side of the cross connection circuit to switch the presently-used transmission path and the reserve transmission path and comprises slot sections, first selecting section selectively connecting any one of the slot sections to the input side of the first switching section, second selecting section connecting the output side of the first switching section to the input side of the cross connection circuit, third selecting section selectively connecting the output side of the cross connection circuit to the input side of any of the second switching sections, and fourth selecting section connecting the output side of the second switching section to any one of the slot sections.

17 Claims, 28 Drawing Sheets

FIG. 15
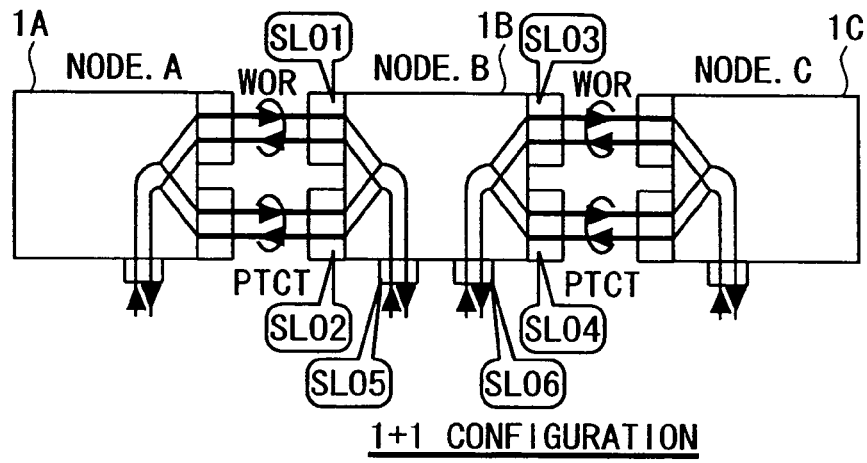
1+1 CONFIGURATION
⇩ INSERVICE
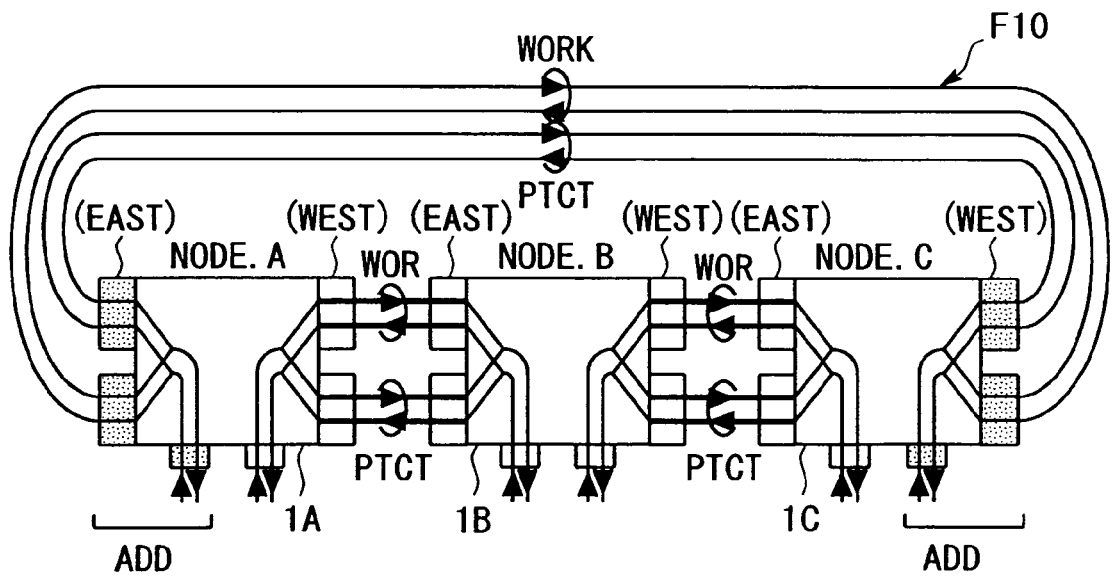
4FIBER BLSR CONFIGURATION

TERMINAL RELAY DEVICE AND RELAY METHOD

CROSS-REFERENCE TO RELATED APPLICATION

This is a continuation of Application PCT/JP2003/004011, filed on Mar. 28, 2003, now pending, the contents of which are herein wholly incorporated by reference.

BACKGROUND OF THE INVENTION

1. Technical Field

The present invention relates to a terminal relay device in a network.

2. Background Arts

SONET (Synchronous Optical NETwork)/SDH (Synchronous Digital Hierarchy) is known as the International Standards for a high-speed digital communication system employing an optical fiber, and is utilized for a backbone line of the Internet that establishes connections among Internet service providers. The SONET/SDH provides communication services using optical transmission levels based on OC-N (Optical Carrier N) such as OC-192, OC-48, OC-12, etc. Herein, OC-N, of which the basic unit is OC-1 (51.840 Mbps), is the SONET standard for specifying a transmission level given by an integral multiple (N-fold number) thereof. The term "SONET" is mainly used in North America. On the other hand, SDH is the standard (ITU standard) for Japan, Europe, etc. as the standard related to SONET. Both of the standards are called SONET/SDH.

Given as network applications on the SONET/SDH are a terminal configuration, a Linear ADM (Add Drop Multiplex) configuration, a UPSR (Uni-directional Path Switched Ring) configuration, a 2F-BLSR (Bi-directional Line Switched Ring) configuration, a 4F-BLSR configuration, and so forth.

FIG. 1 shows a network taking the terminal configuration. As in FIG. 1, the terminal configuration is that a point-to-point connection of terminal relay devices (which are also called ADX (Add Drop Cross-connect) devices) is established. In the terminal configuration, the terminal relay device supports a line redundancy function employing an APS (Automatic Protection Switch) adopting a 1+1 (one working traffic transmission path plus one protection traffic transmission path) configuration, etc.

In this terminal configuration, an interface card called an OC-N card is attached to a slot on a SONET/SDH side (which will hereinafter be referred to as a higher-level side) of each terminal relay device. This OC-N card is an interface that supports the OC-N (e.g., OC-48) transmission level given above.

As in FIG. 1, the terminal configuration involves employing one OC-N card for each of the working traffic and the protection traffic. Further, two lines of optical fibers F1, F2 are connected to the working traffic for transmitting and receiving. Similarly, two lines of optical fibers F3, F4 are connected to the protection traffic for transmitting and receiving.

This OC-N card is connected to an interface card (INF Card) to a low-order network (which hereinafter referred to as a lower-level side) connected to the SONET/SDH via a cross-connect processing circuit (XC card) and a line switch (Line SW) or a line bridge (Line BR). In this case, a transmission path extending from the lower-level side toward the SONET/SDH is called a transmission path in an add direction. Further, a transmission path extending from the SONET/SDH toward the lower-level side is called a transmission path in a drop direction.

Moreover, in the terminal configuration, signals from the lower-level side are transmitted from both of the working traffic transmission path and the protection traffic transmission path via, e.g., a line bridge 300. On the other hand, in signals received from both of the working traffic transmission path and the protection traffic transmission path, e.g., a line switch 301 selects a signal of the transmission path exhibiting a better transmission quality.

FIG. 2 shows a network taking the Linear ADM configuration. In the linear ADM configuration, three or more pieces of terminal relay devices (ADX devices) are linearly connected. FIG. 2 shows details of the terminal relay device (ADX device) located at an intermediate (relay) station on the link. In the Linear ADM configuration also, the terminal relay device performs route setting based on the add/drop function within the device, and performs at the same time a scheme for making the line redundant similarly to FIG. 1.

FIG. 3 shows a network taking the UPSR configuration. As shown in FIG. 3, the UPSR configuration is that the terminal relay device is connected to a ring network configured by two circuits of optical fibers F1-F4 and optical fibers F2-F3. In this type of ring-shaped network, in the two circuits, an interface existing on the left side as viewed from one terminal relay device is called an east-side (East) interface. Further, an interface existing on the right side as viewed from one terminal relay device is called a west-side (West) interface. The naming "the east-side" and "the west-side" is the naming for convenience in terms of simply distinguishing between the connecting directions but is not related directly to the actual geographical azimuth.

In the example in FIG. 3, the east-side OC-N card is connected to the optical fibers F1 and F2. Further, the signal is transmitted along the fiber F1 in a rightward circulating direction. Moreover, the signal is received along the fiber F2 in a leftward circulating direction.

Similarly, the west-side OC-N card is connected to the optical fibers F3 and F4. Further, the signal is transmitted along the fiber F3 in the leftward circulating direction. Moreover, the signal is received along the fiber F4 in the rightward circulating direction.

In the case of a high speed side line (OC-N) taking the UPSR configuration as shown in FIG. 3, signal channels allocated to communications between respective nodes (the terminal relay devices) on the system (ring network) are based on the transmission level represented by, e.g., STS-1 or OC-1, etc., wherein a line capacity for N-channels is built up on the whole.

On the card in charge of TSI (Time Space Interchange) within the device and a variety of protection switchover processes, for example, a lower-level side line (Tributary line) is subjected to line-setting in a higher-level side line (OC-N UPSR) direction. Namely, the lower-level side line is allocated with a line among the lines for (STS-1×N) channels on the UPSR network. This allocation process is called an add process.

On the occasion of this add process, the bridge 300 allocates the signals on the same line to both of the east side and the west side, whereby the signals on this line are transmitted along different routes on the ring network and the redundant configuration is thus actualized.

On the other hand, the signal receiving-side node (the terminal relay device) executes the line setting in a reversed direction (the higher-level side line→the lower-level side line) to the direction described above. In this case, the higher-level east- and west-side channels are extracted and allocated onto the lower-level side line.

Namely, the respective east- and west-side line signals that become termination target signals on the higher-level side line, are extracted. Then, the path switch 301 selects, on a path-level basis, the line exhibiting a better line quality from a detection state such as a path alarm etc. on the line.

By contrast, when the transmission path (line) is disconnected, etc., saving on a line-by-line basis is called line protection. Further, a switch used for the line protection and serving to switch over the working traffic line and the protection traffic line on the line-by-line basis, is called a line switch.

Note that a component (module) for branching off the signals into the working traffic line and the protection traffic line on the line-by-line basis is named a line bridge.

FIG. 4 shows a network taking a 2F-BLSR configuration. As shown in FIG. 4, in the 2F-BLSR configuration also, the terminal relay device, as in the case of the UPSR configuration, is connected to a ring network configured by two circuits of optical fibers F1-F4 and optical fibers F2-F3.

In the network based on the BLSR configuration, however, the terminal relay device (ADX device) does not transmit the same signal in the two directions on the east side and the west side when in transmission. If a fault occurs in the ring configuration using the two circuits (2 lines) of optical fibers, loopback (Bridge) control is executed on the line-by-line basis by use of OH (OverHead) bytes on an APS (Automatic Protection Switch) protocol, and the signal of the working channel is shifted to a protection channel. With this scheme, the line saving is attained on the network taking the BLSR configuration.

FIG. 5 shows a network taking a 4F-BLSR configuration. In the 4F-BLSR configuration, the terminal relay device is connected to a ring network configured by four circuits (4 lines) of optical fibers. In the 4F-BLSR configuration, the terminal relay device executes, in the 4-fiber ring configuration, the line saving by 1+1 line protection and the line saving by a loopback operation on the line-by-line basis that employs the OH bytes on the APS protocol when both of the working traffic line and the protection traffic line are disconnected.

A main function of each of these terminal relay devices is the line setting (TSI) on the network. The line setting connotes a Through/Add/Drop process mapping onto an OC-N signal frame on the line-by-line basis. The terminal relay device employs (implements) a combination of functions corresponding to a variety of applications described above, and one single device is shared among the plurality of applications.

FIG. 5 shows an example of the network in which the higher-level side lines (OC-N) are configured by the 4F-BLSR. As describe above, the 4F-BLSR combines the 2F-BLSR configuration in which a half of the lines are allocated as the working traffic lines and the remaining half of lines are allocated as the protection traffic lines at a normal time with the 1+1 line protection/BLSR line saving.

The terminal relay device described above has interface cards (called OC-N cards) corresponding to the transmission levels (OC-N) on the network in a way that supports the variety of network applications. Further, this terminal relay device has a line setting (cross-connect) card, as a main component, provided with a variety of protection switchover functions.

FIG. 6 shows an example of a configuration of the terminal relay device implementing a plurality of protection functions. In FIG. 6, interface cards (INFcard#1-INFcard#n) are OC-N interface function units corresponding to the respective transmission levels on the higher-level side, or interface function units to the lower-level side lines.

These interface cards are, aiming at an OC-N transmission frame generating/terminating function, used as working (Work) channel/Protection (Protect) channel units when in the 1+1 redundant configuration, or east-side/west-side transmission units when in the ring configuration, or add/drop units on the lower-level side.

System blocks (Sys#1-Sys#n) provided in front and in rear of the cross-connect processing unit (XC) execute protection channel switchover corresponding to each of the variety of network applications by the line-setting. For example, the system block actualizes the line switchover process based on the APS protocol with respect to the transmission path (line) when in the 1+1 redundant configuration for the OC-N level transmission path. Moreover, the system block and the cross-connect processing unit configure a system capable of supporting the multiple applications by a line-setting (Add/Drop/Through) function.

In the configuration of the terminal relay device shown in the conventional example, however, the variety of protection channel switchover processing circuits and the cross-connect processing units are inflexible in their layout with respect to the corresponding interface cards.

Moreover, a line protection switchover circuit for switching over the working traffic and the protection traffic on the line-by-line basis and a path protection switchover circuit for switching over the working traffic and the protection traffic on a channel-by-channel basis, have hitherto been combined as a selector circuit.

Further, there has hitherto been a configuration in which the line protection switchover circuit, the path protection switchover circuit, etc. are arranged in series. For instance, a configuration in FIG. 6 is that a system block 310 for executing a Line APS process and a system block 311 for executing a BLSR process are connected in series.

In this configuration, when executing the Line APS process, the system block 311 for executing the BLSR process is set "Through". Furthermore, when executing the BLSR process, the system block 310 for executing the Line APS process is set "Through".

Thus, there has been adopted the configuration of sharing the (single) switchover circuit with the plurality of functions, or the configuration of establishing the in-series connection of the plurality of switchover circuits, and using one circuit while setting the other circuit "Through". Such a configuration has a problem, wherein once the operation starts, the single switchover circuit is shared with the plurality of functions, and hence this switchover signal can not be changed independently of other functions. Then, there arises a problem that restriction is given to an in-device accommodating position (Slot) of the interface card connected to this switchover circuit and an upgrade method/function thereof.

SUMMARY OF THE INVENTION

Namely, the device including the cross-connect processing circuit according to the prior art has such a connection relation that the interfaces with the variety of protection switchover functions required other than the line setting are fixedly connected to the slots of the corresponding interface cards. Therefore, the restriction is given to the in-device accommodating position (Slot) of the interface card, and hence, when re-configuring (including an in-service upgrade) the system such as an extension/exchange of the interface cards, this needs line disconnection or line re-setting, and so on. Accordingly, a problem arises, wherein it is difficult to make it compatible to re-configure the system and to provide customers with sufficient services.

Moreover, in the BLSR network, the path-Through of the protection channels is executed as a working traffic channel saving operation when a fault occurs in the line between the nodes. That is, the terminal relay device connected to the link where the fault occurs effects loopback of the channel to the link in the reversed direction to the direction of the fault-occurred link, thereby saving the channel through the ring in the reversed direction.

On the occasion of this path-Through, the channel when the line is normal and the channel when in the Through-setting are fixed as the same channels. This is because, on the occasion of the path-Through, if a change in the channel, i.e., a change in timeslot is approved, it can not be, when performing the saving operation, recognized which channel the normal-time channel corresponds to. Such an inflexible timeslot allocation process causes a problem that line efficiency on the network can not be increased.

Moreover, an improvement of throughput of the cross-connect processing circuit is increasingly demanded of the transmission device aiming at supporting the multiple network applications described above and at device-downsizing. Under this circumstance, there remarkably increases a load in signal capacity on the variety of protection switchover circuits, including the cross-connect processing of the main signal.

It is an object of the present invention, which was devised in view of the problems inherent in the prior arts, to provide customers with sufficient services and functions by flexibly executing re-configuration of a network system including a terminal relay device, and switchover of working traffic/protection traffic channels.

The present invention adopts the following means in order to solve the problems given above. Namely, the present invention is a terminal relay device in a network, including a cross-connect processing circuit for executing a cross-connect process including line setting on a network, a first transmission path switchover unit for switching over a working traffic transmission path for providing a line on the network and a protection traffic transmission path serving as a substitute transmission path for the working traffic transmission path on an input side of the cross-connect processing circuit, and a second transmission path switchover unit for switching over a working traffic transmission path for providing a line on the network and a protection traffic transmission path serving as a substitute transmission path for the working traffic transmission path on an output side of the cross-connect processing circuit. Further, the cross-connect processing circuit has a plurality of input-side interfaces and a plurality of output-side interfaces, and the first transmission path switchover unit and the second transmission path switchover unit each have an input-side interface and an output-side interface.

Then, the terminal relay device comprising a plurality of slot units, into which interface units connectable to the transmission path on the network or interface units connectable to a low-order network connected to the network are inserted, said each of slot unit receiving a transmitting terminal or a receiving terminal on the interface unit connectable to the network or the low-order network, a first selection unit for selectively connecting the receiving terminal on the interface unit inserted into any one of the slot units to the input-side interface of the first transmission path switchover unit, a second selection unit for connecting the output-side interface of the first transmission path switchover unit to the input-side interface of the cross-connect processing circuit, a third selection unit for selectively connecting the output-side interface of the cross-connect processing circuit to the input-side interface of the second transmission path switchover unit, and a fourth selection unit for connecting the output-side interface of the second transmission path switchover unit to the transmitting terminal on the interface unit inserted into any one of the slot units.

Preferably, the second selection unit may connect the receiving terminal connected via the first selection unit and the first transmission path switchover unit, to the input-side interface of the cross-connect processing circuit, wherein the input-side interface is set corresponding to a slot position into which the interface including the receiving terminal is inserted.

That is, with a combination of the first selection unit and the second selection unit, the receiving terminal is connected to the input-side interface of the cross-connect processing circuit that corresponds to the slot position including the receiving terminal. Herein, an expression "corresponding to the slot position" connotes that, for instance, a logical positional relation of each slot position corresponds to a logical positional relation of each input-side interface of the cross-connect processing circuit.

Preferably, the third selection unit may connect the transmitting terminal connected via the second transmission path switchover unit and the fourth selection unit, to the output-side interface of the cross-connect processing circuit, wherein the output-side interface is set corresponding to a slot position into which the interface including the transmitting terminal is inserted.

Namely, with a combination of the third selection unit and the fourth selection unit, the transmitting terminal is connected to the output-side interface of the cross-connect processing circuit that corresponds to the slot position including the transmitting terminal.

Preferably, the terminal relay device may further comprise a quality judging unit for judging a transmission quality on the network, wherein the first transmission path switchover unit or the second transmission path switchover unit may switch over the working traffic transmission path and the protection traffic transmission path in accordance with the transmission quality.

Further, it is desirable that a terminal relay device connected to a network including a first ring transmission path having a working traffic transmission path in a first direction and a protection traffic transmission path in the first direction, and a second ring transmission path having a working traffic transmission path in a second direction and a protection traffic transmission path in the second direction, the relay device comprising a cross-connect processing circuit for executing a cross-connect process of a communication channel on the network, a first transmission switchover unit for switching over a working traffic transmission path from the first direction and a protection traffic transmission path from the second direction that serves as a substitute transmission path for the working traffic transmission path on a receiving side from the network with respect to the cross-connect processing circuit, and a second transmission switchover unit for switching over a working traffic transmission path toward the first direction and a protection traffic transmission path toward the second direction that serves as a substitute transmission path for the working traffic transmission path on a transmitting side toward the network with respect to the cross-connect processing circuit.

Then, it is preferable that the first transmission path switchover unit includes channel information detecting unit distinguishing an on-communicating communication channel in the working traffic transmission path, channel identifying unit identifying, based on the channel information, a communication channel contained in the protection traffic transmission path, which corresponds to the communication channel used in the working traffic transmission path, and a switch unit for switching over the communication channel of the working traffic transmission path to the communication channel of the protection traffic transmission path, which is identified based on the channel identifying unit.

According to this terminal relay device, when switching over to the protection traffic side, the protection traffic channel is identified by the channel identifying information for identifying the communication channel used in the working traffic. Namely, the protection traffic channel corresponding to the working traffic (channel) is selected and switched over based on the channel identifying information.

Preferably, the terminal relay device may further comprise a third transmission path switchover unit for switching over a working traffic transmission path from the second direction and a protection traffic transmission path from the first direction that serves as a substitute transmission path for the working traffic transmission path on a receiving side from the network with respect to the cross-connect processing circuit, and a fourth transmission path switchover unit for switching over a working traffic transmission path toward the second direction and a protection traffic transmission path toward the first direction that serves as a substitute transmission path for the working traffic transmission path on a transmitting side toward the network with respect to the cross-connect processing circuit, and the third transmission path switchover unit may include channel information detecting unit distinguishing an on-communicating communication channel in the working traffic transmission path, channel identifying unit identifying, based on the channel information, a communication channel contained in the protection traffic transmission path, which corresponds to the communication channel used in the working traffic transmission path, and a switch unit for switching over the communication channel of the working traffic transmission path to the communication channel of the protection traffic transmission path, which is identified based on the channel identifying unit.

This third transmission path switchover unit switches over the receiving signal from the direction (the second direction) different from the direction of the receiving signal with respect to the first transmission path switchover unit. That is, the third transmission path switchover unit identifies the communication channel of the receiving signal from the second direction on the basis of the channel information, and switches over the channel between the working traffic side and the protection traffic side.

Preferably, the working traffic transmission path and the protection traffic transmission path may respectively have different transmission mediums in the first ring transmission path, and the working traffic transmission path and the protection traffic transmission path may respectively have different transmission mediums in the second ring transmission path.

Moreover, a terminal relay device comprises a cross-connect processing circuit for executing a cross-connect process including line setting on a network, and a control circuit for controlling the cross-connect processing circuit, and the control circuit includes a control transmission path including a plurality of channels corresponding to transmission paths of the network, a switchover unit for switching over the channel in the control transmission path, and a setting unit for setting, in the cross-connect processing circuit, a corresponding relation between a channel after being switched over by the switchover unit and a channel before being switched over by the switchover unit.

Thus, the present terminal relay device includes the plurality of channels corresponding to the transmission paths on the network. As a result, independently of the network transmission path, a corresponding relation of the cross-connect process to the channel on this transmission path can be generated. Accordingly, it is possible to obtain the control information for setting the cross-connect processing circuit without being influenced by the network transmission path itself.

Preferably, the terminal relay device may further comprise an identifying information generation unit for generating a piece of identifying information for identifying the channel, and inputting the identifying information to a corresponding channel of the control transmission path. This identifying information is inputted to the channel corresponding to the control transmission path, whereby the corresponding relation before and after the cross-connect process can be recognized.

Preferably, the control transmission path may include a first control transmission path including a plurality of channels corresponding to the working traffic transmission paths included in the network, and a second control transmission path serving as a substitute transmission path for the first control transmission path, corresponding to the protection traffic transmission path included in the network, and the switchover unit may switch over the channel between the first control transmission path and the second control transmission path.

Preferably, the control transmission path may further include a third transmission path including a channel on the side of entering the network, and a fourth transmission path including a channel on the side of exiting the network, and the switchover unit may include an input-side switchover unit for switching over the channel between the first control transmission path and the second control transmission path or the third transmission path on the input side to the switchover unit, and an output-side switchover unit for switching over the channel between the first control transmission path and the second control transmission path or the fourth transmission path on the output side to the switchover unit.

Moreover, the present invention may also be a relay method for executing the relay described above.

BRIEF DESCRIPTION OF THE DRAWINGS

FIG. 15 is a view showing a procedure for upgrading from the Linear ADM configuration to 4-fiber BLSR;

DETAILED DESCRIPTION OF THE INVENTION

Figure 1:
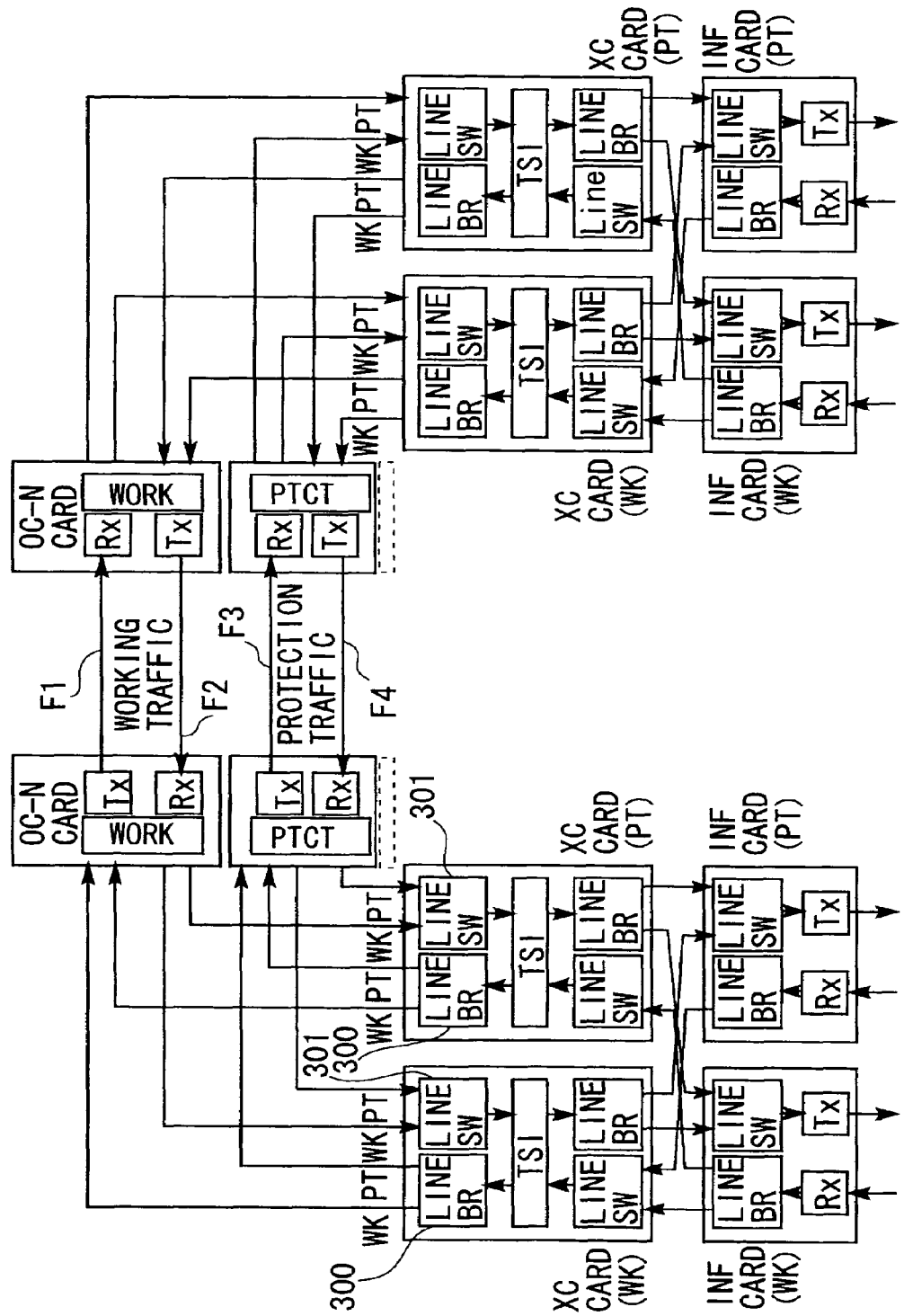
FIG. 1 is a view showing a network taking a terminal (1+1) configuration according to the prior art.
Figure 2:
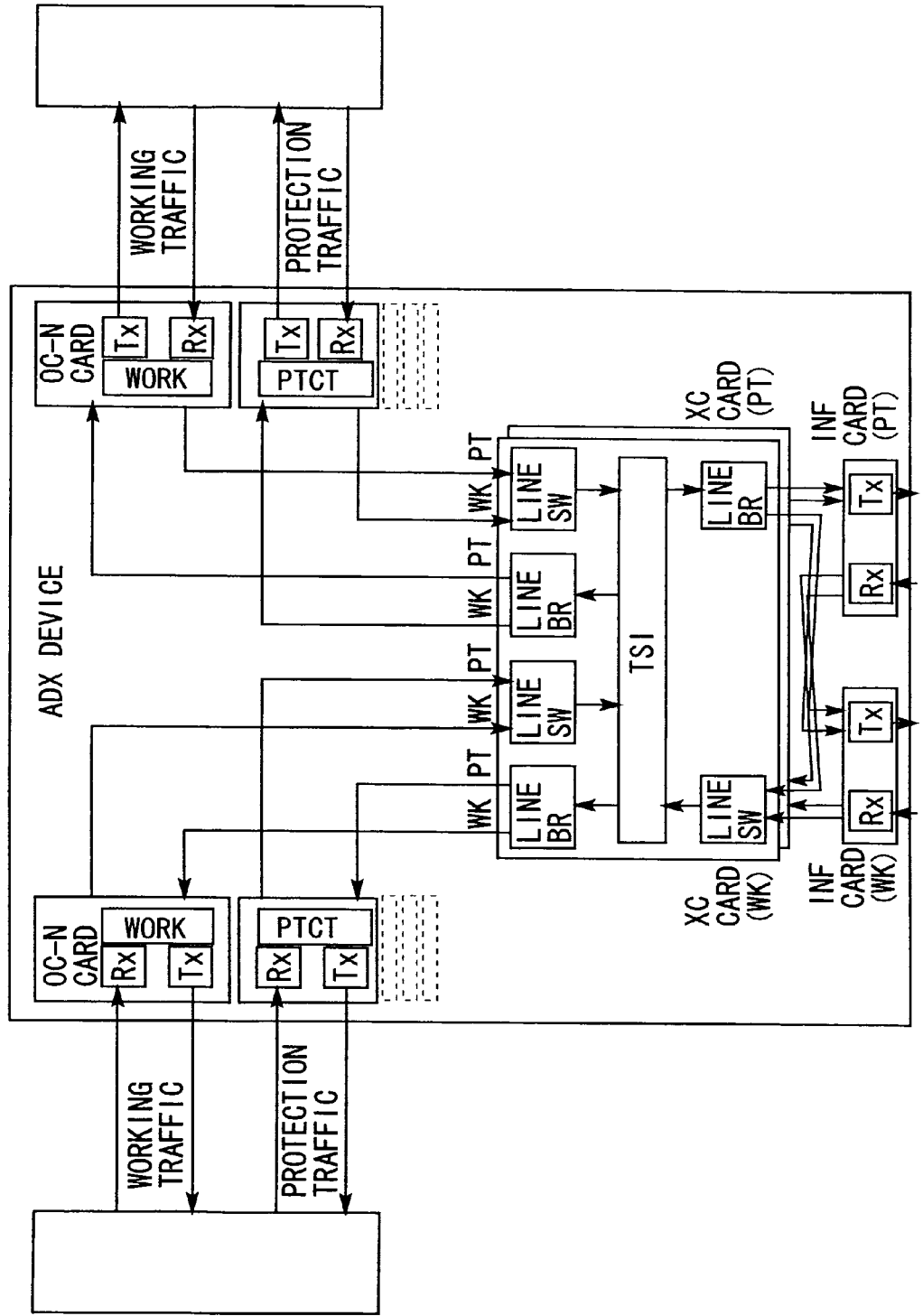
FIG. 2 is a view showing a network taking a Linear ADM configuration according to the prior art.
Figure 3:
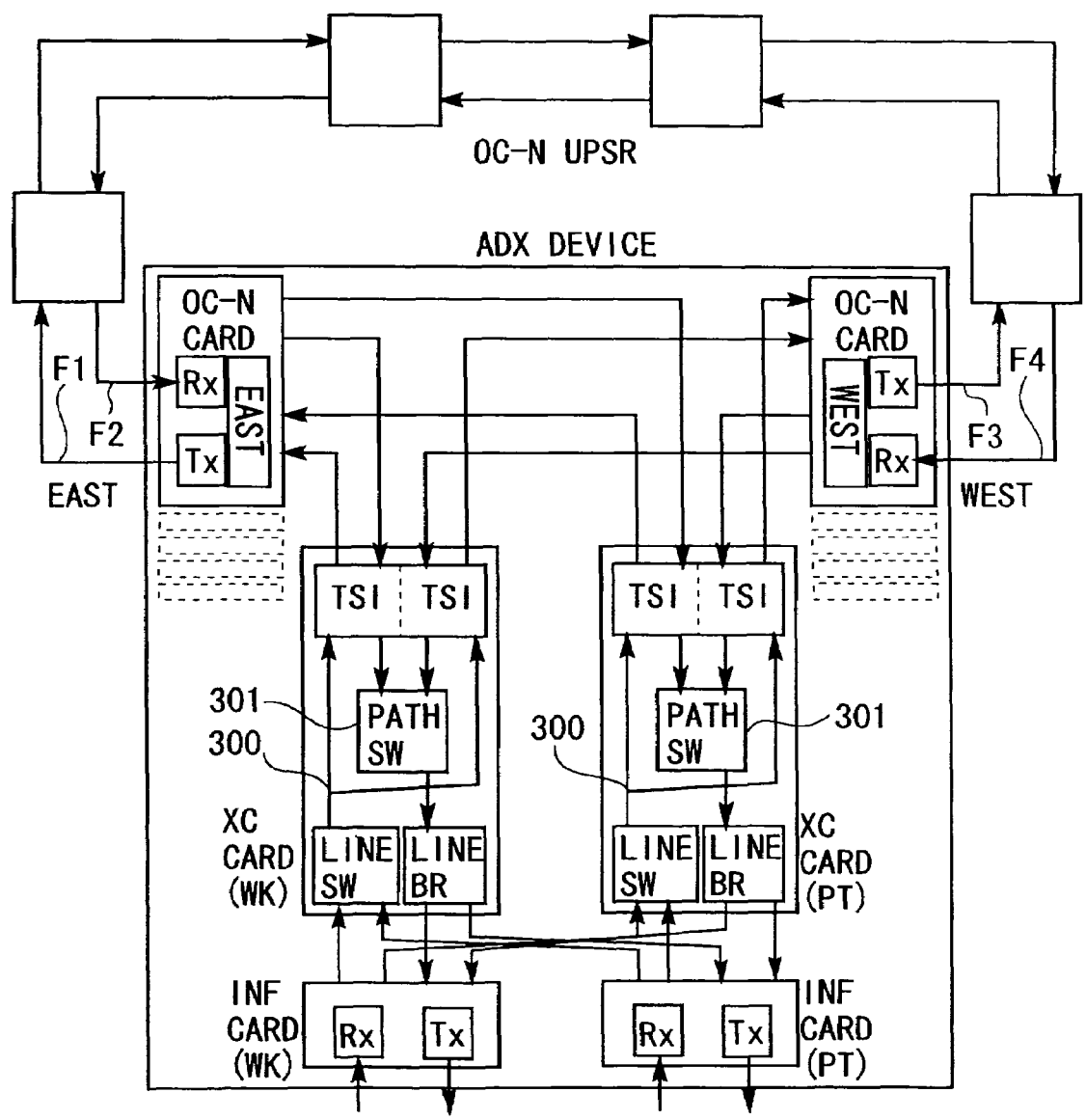
FIG. 3 is a view showing a network taking a UPSR configuration according to the prior art.
Figure 4:
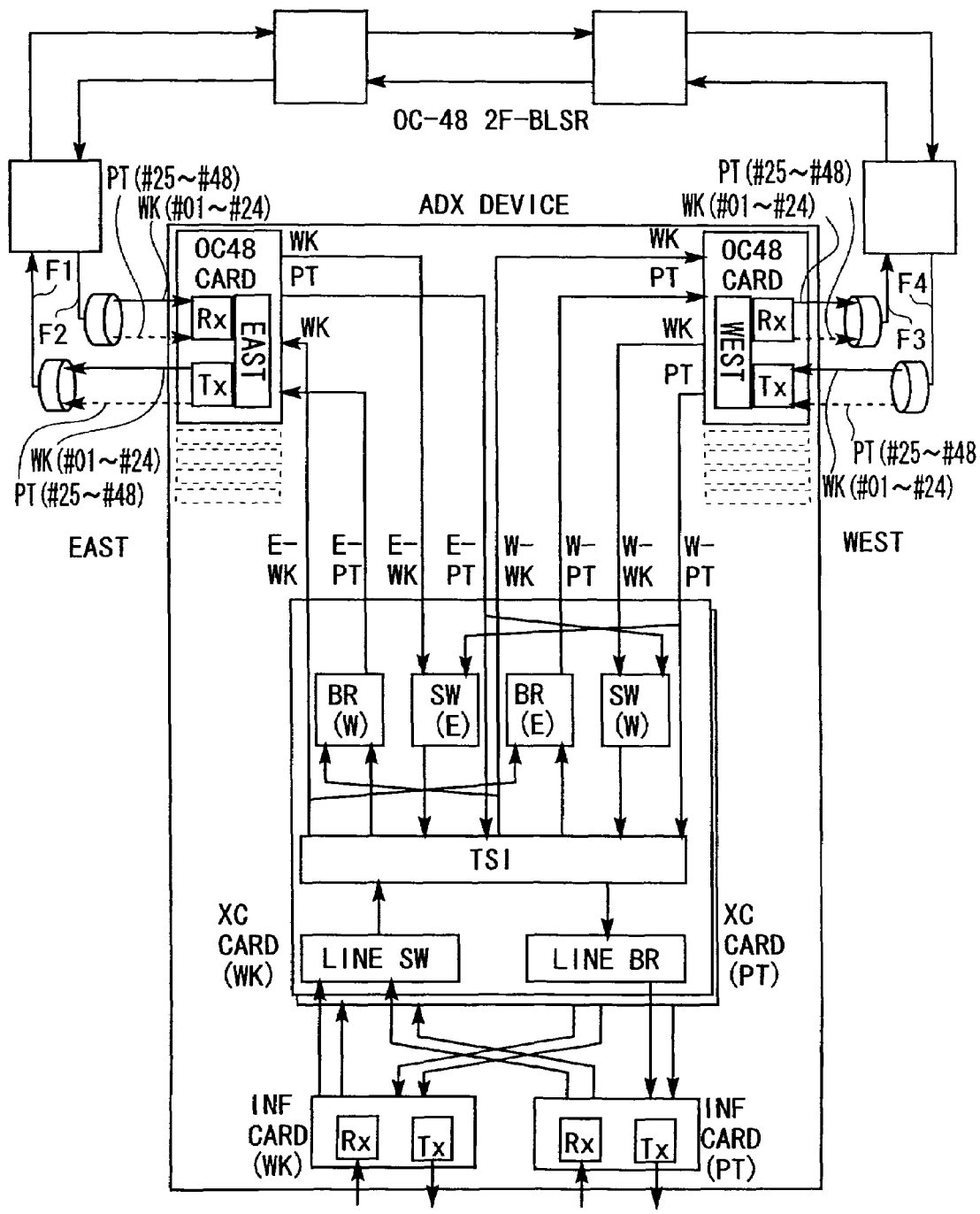
FIG. 4 is a view showing a network taking an OC-48 level/2-fiber BLSR configuration according to the prior art.
Figure 5:
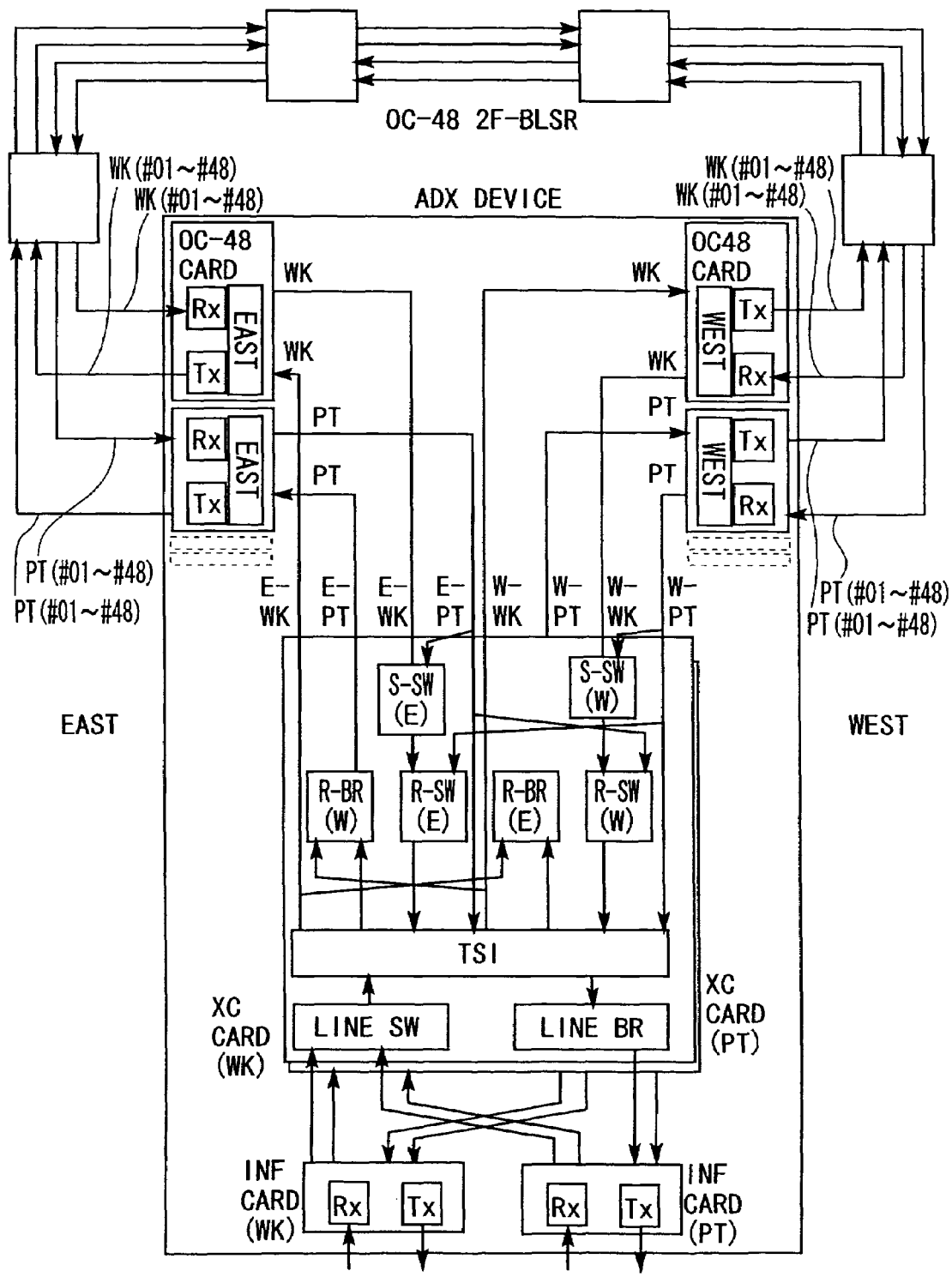
FIG. 5 is a view showing a network taking an OC-48 level/4-fiber BLSR configuration according to the prior art.
Figure 6:
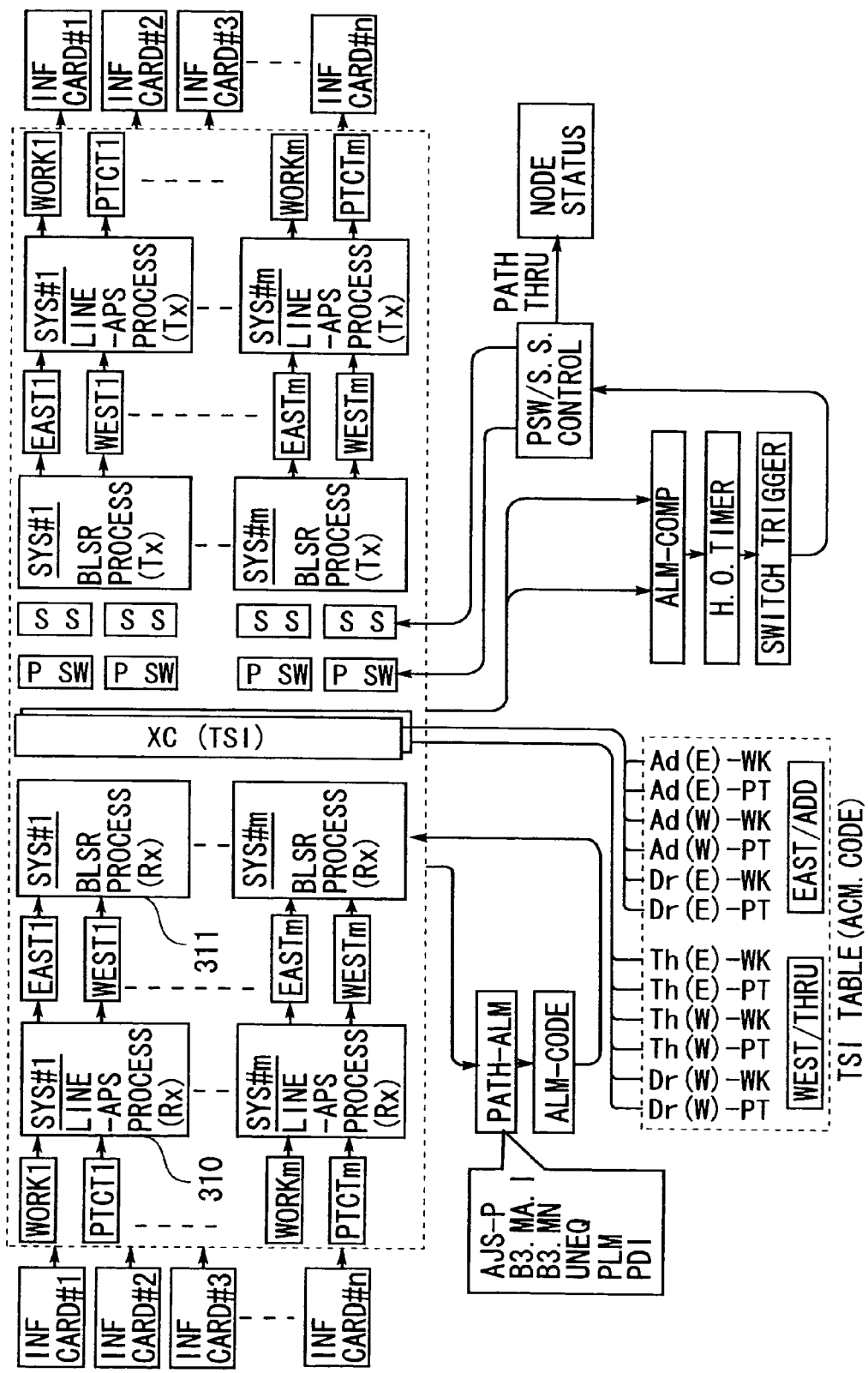
FIG. 6 shows an example of a configuration of a terminal relay device implementing a plurality of protection functions.

Preferred embodiments of the present invention will hereinafter be described with reference to the drawings.

First Embodiment

A terminal relay device in a network according to a first embodiment of the present invention will hereinafter be described with reference to the drawings in FIGS. 7 through 11. Given herein is an explanation of one example in which the present invention is applied to an ADX (Add, Drop Cross-connecting) device on a SONET/SDH optical network (OC-N level: Optical Carrier level for SONET transmission over fiber-optic cabling) pursuant to NNI (Network Node Interface). This type of ADX device will hereinafter be called a terminal relay device.

A terminal relay device 1 according to the first embodiment connects interface card pairs (for working channels/protection channels and for add/drop, or for east-side channels/west-side channels and for add/drop) configuring a variety of system applications to slot positions without any restrictions. To be specific, this terminal relay device 1 enables the network to be configured by connecting the working channels/protection channels, the east-side channels/west-side channels, or the add channels/drop channels to the arbitrary slot positions.

When trying to build up all the combinations, however, actualization thereof becomes difficult to attain due to a tremendous scale of circuits. Therefore, a hardware configuration is formed by blocks (which will hereinafter be called system blocks) in which processing units for switching over the working channels/protection channels or the east-side channels/west-side channels are organized batchwise on an OC-48 (STS-1×48 ch) basis. Then, there is provided a line APS processing unit or a BLSR processing unit that executes a switch-over/switch-back process of a transmission path (line) within this system block.

Moreover, this terminal relay device 1 includes an application selector for actualizing a flexible connection between a receiving terminal of an interface inserted into a slot and an input-side terminal of each system block or from an output-side terminal of the system block to a transmitting terminal of the interface inserted into the slot. This application selector restrains the circuit scale and actualizes the pair configurations of all the arbitrary slots.

Further, the input side of a cross-connect processing circuit is provided with an application selector for returning from a system block output to the slot position. Still further, the output side of the cross-connect unit is also provided with an application selector for setting from the slot position to the input side of the system block.

These types of application selectors enable the setting of the cross-connect positions on a slot standard at a front of the actual terminal relay device 1. Accordingly, a user can set the cross-connect without being aware of the system block within the hardware. Note that in the following embodiments, a communication path (line) (e.g., OC-1) serving as an object for the cross-connect is called a line or a channel.

Figure 7:
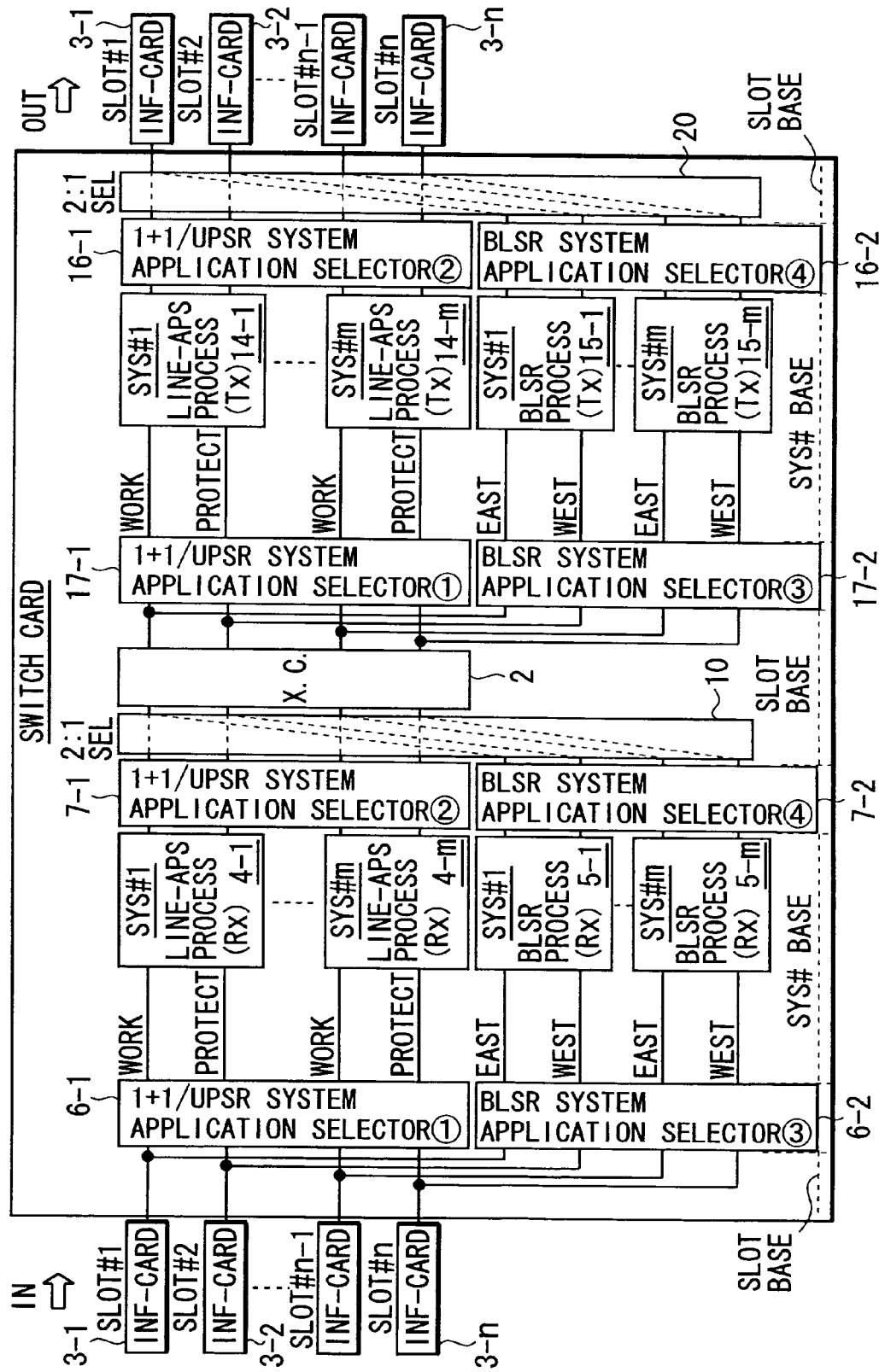
FIG. 7 shows one example of a terminal relay device 1 according to a first embodiment of the present invention.

FIG. 7 shows a configuration of the terminal relay device 1 according to the first embodiment. As shown in FIG. 7, this terminal relay device 1 has a cross-connect processing circuit 2 and a variety of switch circuits provided in front and in rear of (right and left in FIG. 7) of the cross-connect processing circuit 2.

Herein, an assumption is that an input-side circuit (receiving-side circuit) of the terminal relay device 1 is constructed on the left side of the cross-connect processing circuit 2 as viewed on the sheet surface in FIG. 7 (which is indicated by an arrow IN). It is also assumed that an output-side circuit (transmitting-side circuit) of the terminal relay device 1 is constructed on the right side of the cross-connect processing circuit 2 (which is indicated by an arrow OUT).

The input-side circuit includes slots 3-1 through 3-n into which a variety of interface cards are inserted, input-side system blocks 4-1 through 4-m for executing a Line APS process and input-side system blocks 5-1 through 5-m for executing a BLSR process, an application selector 6-1 for connecting the slots 3-1 through 3-n to the input sides of the system blocks 4-1 through 4-m, an application selector 6-2 for connecting the slots 3-1 through 3-n to input-side terminals of the system blocks 5-1 through 5-m, an application selector 7-1 for connecting output-side terminals of the system blocks 4-1 trough 4-m via a 2-to-1 selector 10 to input-side terminals of the cross-connect processing circuit 2, and an application selector 7-2 for connecting output-side terminals of the system blocks 5-1 trough 5-m via the 2-to-1 selector 10 to the input-side terminals of the cross-connect processing circuit 2.

The output-side circuit includes the slots 3-1 through 3-*n* into which the variety of interface cards are inserted, output-side system blocks 14-1 through 14-*m* for executing the Line APS process and output-side system blocks 15-1 through 15-*m* for executing the BLSR process, an application selector 17-1 for connecting the output-side terminals of the cross-connect processing circuit 2 to input-side terminals of the system blocks 14-1 through 14-*m*, an application selector 17-2 for connecting the output-side terminals of the cross-connect processing circuit 2 to input-side terminals of the system blocks 15-1 through 15-*m*, an application selector 16-1 for connecting output-side terminals of the system blocks 14-1 through 14-*m* to the slots 3-1 through 3-*n* via a 2-to-1 selector 20, and an application selector 16-2 for connecting output-side terminals of the system blocks 15-1 through 15-*m* to the slots 3-1 through 3-*n* via the 2-to-1 selector 20.

Herein, the slots 3-1 through 3-*n* of the output-side circuit are the same as the slots 3-1 through 3-*n* of the input-side circuit. The interface cards connected to the slots 3-1 through 3-*n* respectively have, however, input terminals and output terminals to which different fibers are connected. This being the case, in FIG. 7, for the sake of the convenience, the slots 3-1 through 3-*n* are disposed on both sides of the terminal relay device 1. Then, the slots 3-1 through 3-*n* disposed on the left side of the terminal relay device 1 correspond to the receiving interfaces, and are connected to the input-side fibers or input low-speed transmission paths (lines) (which is indicated by the arrow IN). Moreover, the slots 3-1 through 3-*n* disposed on the right side of the terminal relay device 1 correspond to the transmitting interfaces, and are connected to the output-side fibers or output lower-level transmission paths (which are indicated by an arrow OUT).

In the first embodiment, the interface cards connected to transmission paths having a higher-level OC-N (e.g., OC-48) or to the lower-level transmission paths to be added to this OC-N level, are connected to the slots 3-1 through 3-*n*.

For example, in a case wherein the higher-level transmission paths configure a terminal (1+1) or Line ADM network, working or protection traffic OC-N level interface cards are inserted into any one of the slots 3-1 through 3-*n*.

Further, in a case where the high-speed transmission paths configure the UPSR or BLSR, east- or west-side OC-N level interface cards are connected to any of the slots 3-1 through 3-*n*.

Moreover, the application selectors 6-1 and 6-2 connect the receiving-side slots 3-1 through 3-*n* to any of the input terminals of the system blocks 4-1 through 4-*m* and 5-1 through 5-*m*.

In this case, as for the higher-level transmission path, the working (shown by "Work" in FIG. 7) and protection (shown by "Protect" in FIG. 7) transmission paths (or the east/west transmission path in the UPSR) are connected to the respective input-side terminals of the system blocks 4-1 through 4-*m*.

Then, the system blocks 4-1 through 4-*m* select a Line-APS process, i.e., select the signals of the line having a better quality between the working traffic and the protection traffic. Namely, the system blocks 4-1 through 4-*m* switch over the working traffic and the protection traffic on an OC-N basis depending on the transmission quality. A circuit for executing this type of selection process is a line switch.

On the other hand, the lower-level transmission paths are connected to any of the corresponding input-side terminals, in the working traffic or the protection traffic, of the system blocks 4-1 through 4-*m*. The connection to the terminal relay device 1 from the lower-level transmission path actualizes an add process. Note that the lower-level transmission paths do not take a redundant configuration and are limited to the working traffic.

Further, the east-side (shown by "East" in FIG. 7) and west-side (shown by "West" in FIG. 7) transmission paths configuring the BLSR are connected to the respective input-side terminals of the system blocks 5-1 through 5-*m*.

Moreover, the system blocks 5-1 through 5-*m* execute the receiving-side process in the BLSR between the east-side and the west side. The BLSR process will be separately described in detail with reference to FIG. 11.

The application selectors 7-1 and 7-2 connect the output-side terminals of the system blocks 4-1 through 4-*m* and 5-1 through 5-*m* via the 2-to-1 selector to the cross-connect processing circuit 2. At this time, the application selector 7-1 connects the output-side terminals of the system blocks 4-1 through 4-*m* to the terminals of the cross-connect processing circuit 2, which correspond to the slot positions of the slots 3-1 through 3-*n*. With these connections, the working channels connected to, e.g., the slots 3-1 through 3-*n* are, without depending on the connections to the system blocks 4-1 through 4-*m*, connected to the terminals of the cross-connect processing circuit 2 in positions corresponding to the original slot positions.

Accordingly, the setting of the cross-connect processing circuit 2 for the working channels may be done based on the positions of the slots 3-1 through 3-*n* without depending on the connections to the system blocks 4-1 through 4-*m*. In the first embodiment, this setting is referred to as slot-based setting of the cross-connect processing circuit 2.

The 2-to-1 selector 10 is a circuit for selecting any of the output-side terminals of the application selectors 7-1 and 7-2, and for connecting the selected terminals to the input-side terminals of the cross-connect processing circuit 2.

Herein, the slot-based setting will be exemplified. Now, an assumed case is that slot numbers 1 through n are assigned to the slots 3-1 through 3-*n*. A case is now presumed, wherein the working traffic channels are connected to these slots. Further, there is assumed a case of assigning terminal numbers 1 through n to the input-side terminals of the cross-connect processing circuit 2.

In the present terminal relay device 1, the slots 3-1 through 3-*n* assigned the slot numbers 1 through n that are connected to the working traffic channels are connected to the input-side terminals 1 through n of the cross-connect processing circuit 2 without depending on the processing by the system blocks 4-1 through 4-*m* and 5-1 through 5-*m*.

This is because the application selectors 6-1 and 6-2 connect the slots 3-1 through 3-*n* to any of the input-side terminals of the system blocks 4-1 through 4-*m* or 5-1 through 5-*m*, and thereafter the application selectors 7-1 and 7-2 (as well as the 2-to-1 selector 10) connect the output terminals of the system blocks 4-1 through 4-*m* or 5-1 through 5-*m* to the input-side terminals of the cross-connect processing circuit 2, which have the terminal numbers corresponding to the original slot numbers.

Namely, according to the present terminal relay device 1, a connection relation of the application selectors 6-1 and 6-2, which is set for inputting to the system blocks 4-1 through 4-*m* or 5-1 through 5-*m*, is returned to the original state by the application selectors 7-1, 7-2 and the 2-to-1 selector 10.

The cross-connect processing circuit 2 connects the input-side terminals to the output-side terminals, and converts the timeslots on the input-side transmission paths into the timeslots on the output-side transmission paths. With this process of the cross-connect processing circuit 2, the channels are converted on the spatial transmission paths and timeslots. This process is called TSI (Time Space Interchange). By this TSI, the working traffic channels/protection traffic channels connected to any of the input-side terminals, the east-side channels/west-side channels, or the channels added by the terminal relay device from the lower-level transmission paths, are connected to the output-side terminals of the cross-connect processing circuit 2.

The application selectors 17-1 and 17-2 connect the output-side terminals of the cross-connect processing circuit 2 to any of the input terminals of the system blocks 14-1 through 14-*m* and 15-1 through 15-*m*.

Among those, the channels from the working traffic (shown by "Work" in FIG. 7) and protection traffic (shown by "Protect" in FIG. 7) transmission paths or from the lower-level transmission paths, are connected to the respective input-side terminals of the system blocks 14-1 through 14-*m*.

Note that in this case, basically there exist only the working traffic signals between the output-side terminals of the system blocks 4-1, etc. and the input-side terminals of the system blocks 14-1, etc. (in the circuits interposed between the system blocks 4-1 through 4-*m* and the system blocks 14-1 through 14-*m* in FIG. 7). It is because the higher-level data is APS-processed by the line switch 22, etc., while the lower-level data is sent through (Through).

The terminal relay device 1 in the first embodiment, however, in consideration of applying to other applications, has the transmission paths for both the working traffic and the protection traffic at and after the output-side terminals of the system blocks 4-1, etc. For instance, in FIG. 7, the protection traffic signals (Protect) in addition to the working traffic signals (Work) are shown at the input/output terminals of the application selectors 7-1, 17-1 and at the input-side terminals of the system blocks 14- through 14-*m*.

The system blocks 14-1 through 14-*m* transmit the output signals in a way that branches off the signals into both of the working traffic line and the protection traffic line. A circuit for executing such a drop process is a bridge.

Moreover, the east-side (shown by "East" in FIG. 7) and west-side (shown by "West" in FIG. 7) transmission paths, which configure a ring, are connected to the respective input-side terminals of the system blocks 15-1 through 15-*m*.

Further, the system blocks 15- through 15-*m* execute a transmission-side process in the BLSR between the east side and the west side.

For example, the system blocks 15-1 through 15-*m*, in case a fault occurs at a destination of the transmission of the east side, executes a loopback process on the OC-N basis between the east side and the west side. With this loopback process, the transmission path extending from the east side to the west side can be looped back. The BLSR process will be separately described in depth with reference to FIG. 12.

The application selectors 16-1, 16-2 and the 2-to-1 selector 20 connect the output-side terminals of the system blocks 14-1 through 14-*m* and the system blocks 15-1 through 15-*m* to the slots having the corresponding slot numbers. Herein, the corresponding slots represent slots corresponding to the output-side terminals of the cross-connect processing circuit 2 that are connected to the respective input-side terminals of the system blocks 14-1 through 14-*m* and the system blocks 15-1 through 15-*m*.

Now, a case is assumed, wherein the slot numbers 1 through n are assigned to the slots 13-1 through 13-*n* connected to the working traffic channels on the output side (indicated by the arrow OUT in FIG. 7). Further, there is also assumed a case of assigning the terminal numbers 1 through n to the output-side terminals of the cross-connect processing circuit 2.

In the present terminal relay device 1, the working traffic channels do not depend on the processing by the system blocks 14-1 through 14-*m* and the system blocks 15-1 through 15-*m*, and the output-side terminals 1-*n* of the cross-connect processing circuit 2 are connected to the slots 13-1 through 13-*n* having the corresponding slot numbers 1-*n*. This function is the same as those of the application selectors 6-1, 6-2, 7-1, 7-2 and the 2-to-1 selector 10.

Figure 8:
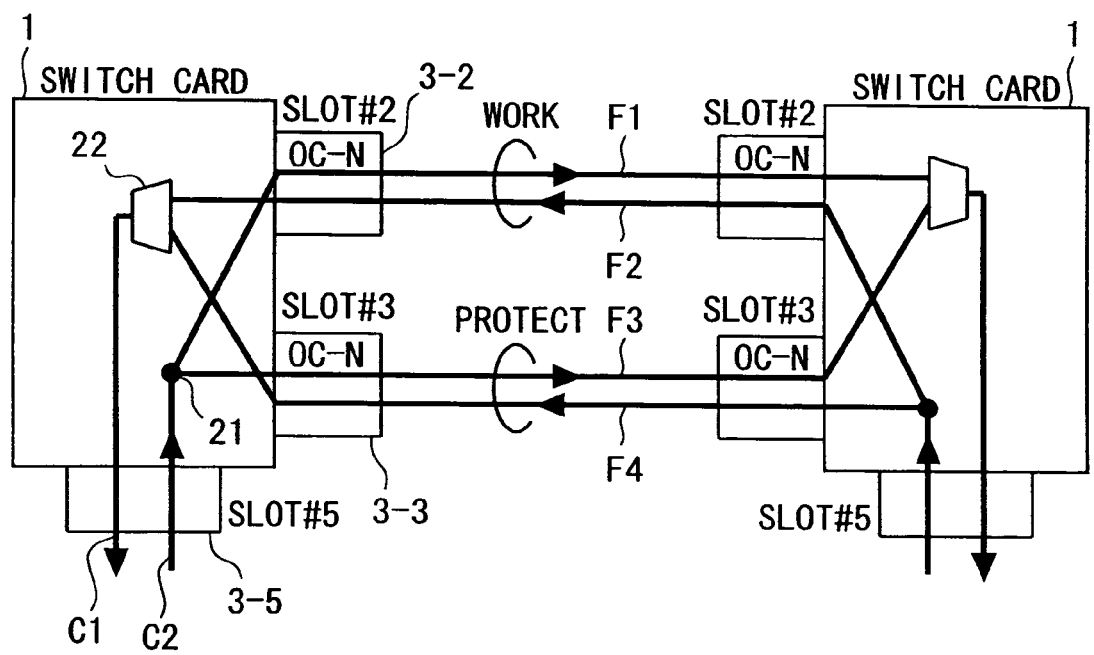
FIG. 8 is a view showing an example of an application in a terminal (1+1) configuration using the terminal relay devices 1, 1.

FIG. 8 shows an example of actually configuring the application in the terminal (1+1) configuration by the OC-N interface cards. In this configuration, the working traffic card and protection traffic card interfacing with the higher-level side are attached to the slot 3-2 (Slot#2) and the slot 3-3 (Slot#3), and the card interfacing with the lower-level side is attached to the slot 3-5 (Slot#5).

In this configuration, on the higher-level side, two lines of optical fibers F1, F2 configure the working traffic transmission path and the working traffic receiving path. Further, other two lines of optical fibers F3, F4 configure the protection traffic transmission path and the protection traffic receiving path.

The interface card attached to the slot 3-5 converts electric signals inputted from a cable C2 into optical signals. Then, a line bridge 21 branches off the signals coming from the lower-level side on the OC-N (e.g., OC-48) basis into the working traffic channel (Work) and the protection traffic channel (Protect). The signals of the working traffic channel are outputted to the fiber F1 via the output terminal of the slot 3-2 (Slot#2). Further, the signals of the protection traffic channel are outputted to the fiber F3 via the output terminal slot 3-3 (Slot#3).

On the other hand, the signals of the working traffic channel of the higher-level input channels are inputted from the fiber F2 via the input terminals of the slot 3-2 (Slot#2). Further, the signals of the protection traffic channel are inputted from the fiber F4 via the input terminals of the slot 3-3 (Slot#3).

The higher-level channels (signals) inputted to the slot 3-1 and the slot 3-3 are selected by the line switch 22 on the OC-N (e.g., OC-48) basis. Then, the signals of the selected channel are outputted to the lower-level side via the interface card attached to the slot 3-5. Namely, the interface card attached to the slot 3-5 converts the optical signals into the electric signals and outputs the signals from the cable C1.

Figure 9:
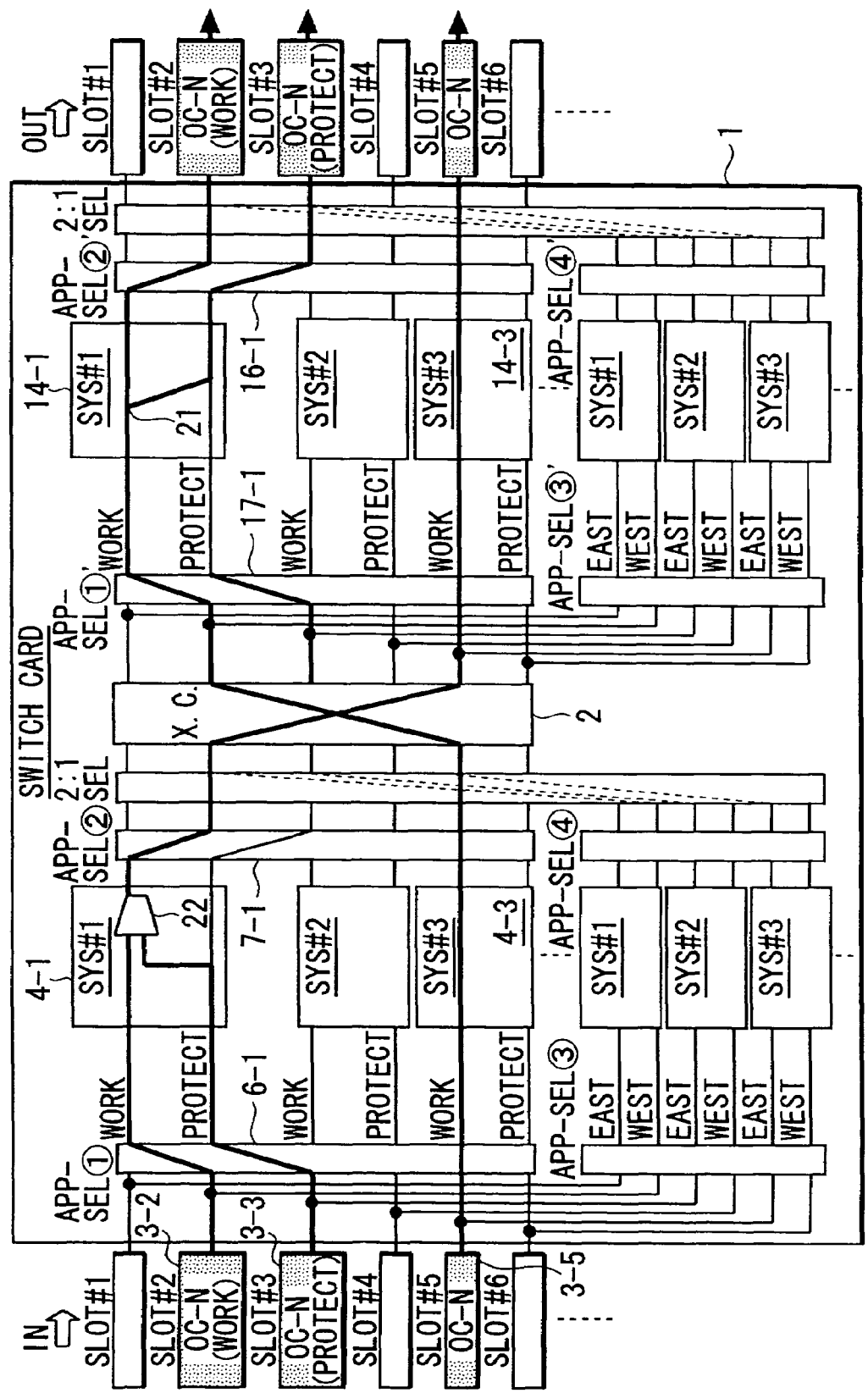
FIG. 9 is a view showing an example of a cross-connect process of the terminal relay device 1 in the application example in the terminal (1+1) configuration.

FIG. 9 shows an example of a cross-connect process of the terminal relay device 1 in the application in FIG. 8. FIG. 9 shows an example of actualizing the drop into the lower-level side from the higher-level side or the add into the higher-level side from the lower-level side in the card configuration in FIG. 8. Note that the components of the terminal relay device 1 are as described in FIG. 7.

To begin with, in the drop direction, the transmission paths for the higher-level side working traffic card and protection traffic card are connected to the system block 4-1 via the application selector 6-1. Then, this system block 4-1 monitors a transmission path quality for the transmission data coming from the higher-level side. Subsequently, with a monitoring result serving as a trigger, working traffic/protection traffic automatic switchover, i.e., the APS (Automatic protection Switch), is carried out. This switchover is executed by the line switch 22.

Next, the APS-processed data is returned to the position of the slot 3-2 (Slot#2) from the position of the system block 4-1 via the application selector 7-1, and is connected to the cross-connect processing circuit 2. Herein, "the return to the position of the slot 3-2 (Slot#2)" connotes that the APS-processed data is connected to the terminal of the cross-connect processing circuit 2 that has a terminal number (e.g., the terminal number 2) corresponding to a slot number (e.g., the slot number 2) of the slot 3-2.

Further, in the example in FIG. 9, the cross-connect processing circuit 2 effects line-setting of the APS-processed data to the position of the slot 3-5 (Slot#5) into which the lower-level card is inserted (the line-setting itself of the cross-connect processing circuit 2 is based on, e.g., designation of the user).

The cross-connected data is connected to the system block 14-3 via the application selector 17-1 and is sent through as it is without being APS-processed. Then, this data is connected to the card of the slot 3-5 (Slot#5) via the application selector 16-1 and is outputted to the lower-level side.

Next, in the add direction, the transmission data coming from the slot 3-5 (Slot#5) on the lower-level side is connected to the system block 4-3 via the application selector 6-1. The system block 4-3 does not execute the APS-process upon the lower-level data. Accordingly, the data is sent through as it is, and is, via the application selector 7-1, returned to the position of the slot 3-5 (Slot#5) from the position of the system block 4-3 and connected to the input-side terminal of the cross-connect processing circuit 2.

Moreover, the cross-connect processing circuit 2 performs the line-setting of the slot 3-2 (Slot#2) into which the higher-level side working traffic card is inserted. Then, the cross-connected data is connected to the working traffic side of the system block 14-1 via the application selector 17-1. Subsequently, the data is, after the line bridge 21 within the system block 14-1 has executed the branch-off processing to the protection traffic side, connected to the interface cards of the slot 3-2 (Slot#2) and the slot 3-3 (Slot#3) via the application selector 16-1 and then outputted to the higher-level side.

Thus, the signal of the slot 3-2 connected to the working traffic channel in the input-side circuit is connected to the input-side terminal, in the positional relation corresponding thereto, of the cross-connect processing circuit 2. On the other hand, in the line switch 22, the signal of the slot 3-3 connected to the protection traffic channel is used as a protection traffic signal for the slot 3-2 signal.

Further, in the output-side circuit as well, the signal of the slot 3-2 connected to the working traffic channel is connected to the output-side terminal, in the positional relation corresponding thereto, of the cross-connect processing circuit 2. On the other hand, the signal of the slot 3-3 connected to the protection traffic channel is branched off from the slot-3-2 signal by the line bridge 21.

Figure 10:
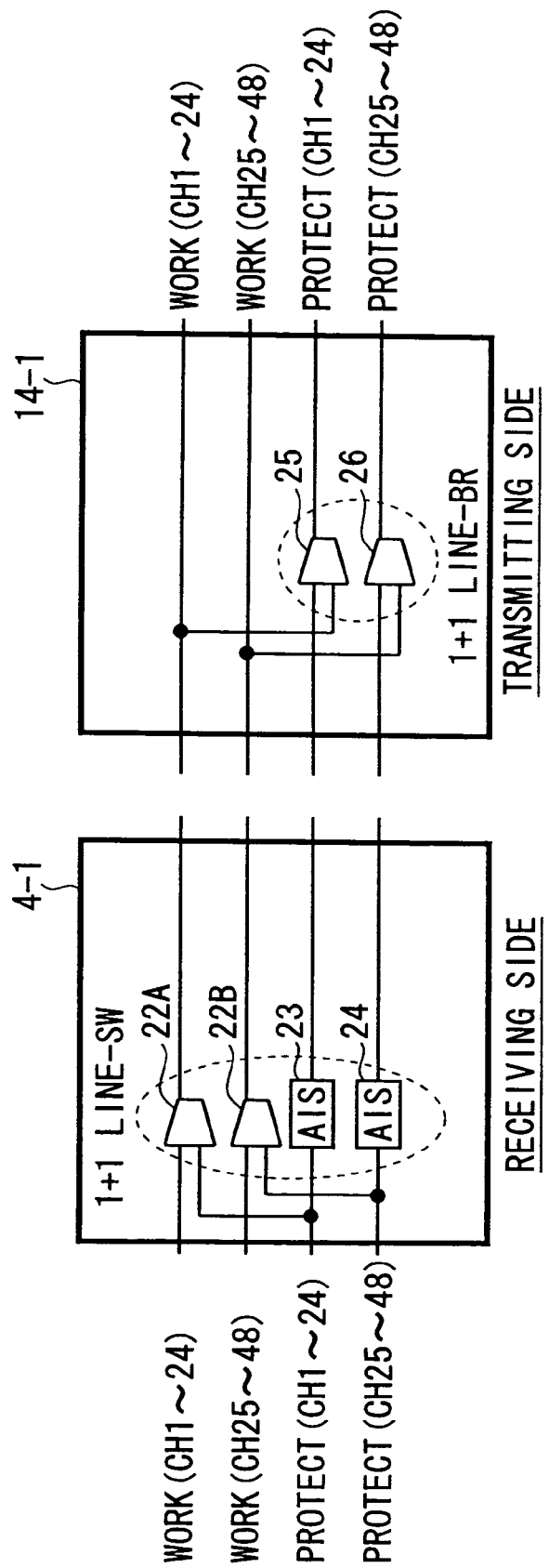
FIG. 10 is a view of a configuration of a line switch and a line bridge for a 1+1 Line APS process within a system block.

FIG. 10 shows a configuration of the line switch and the line bridge for the 1+1 Line APS process within the system block. In the first embodiment, a processing capacity within a single system block is set based on an OC-N (e.g., OC-48) 2-fiber configuration (a single fiber=STS-1×48 ch). The system block 4-1, etc. performs the working traffic/protection traffic switchover control on this OC-N basis when a fault occurs in the transmission path.

Assignment of the transmission paths (channels) in the terminal (1+1) lines in FIG. 10 is that a first line is assigned for the working traffic (channels 1-24), a second line is assigned for the working traffic (channels 25-48), a third line is assigned for the protection traffic (channels 1-24), and a fourth line is assigned for the protection traffic (channels 25-48).

In FIG. 10, the working traffic channels 1-24 and channels 25-48 in the receiving-side block 4-1 correspond one optical fiber, and the protection traffic channels 1-24 and channels 25-48 correspond another optical fiber.

Moreover, in the actual (1+1) line communications, each traffic of the working traffic and the protection traffic in the transmitting-side system block 14-1 involves employing one optical fiber. As a result, in the (1+1) line communications, it follows that four lines of fibers are used between the nodes. Note that in the case of the UPSR configuration, for example, one line of the east-side channels (1-48 for the working traffic) are connected in a rightward circulating direction, while another line of the east-side channels are connected in a leftward circulating direction. Further, one line of the west-side channels (1-48 for the protection traffic) are connected in the rightward circulating direction, while another line of the west-side channels are connected in the leftward circulating direction. In this type of configuration, as viewed from the entire UPSR, one line of the optical fibers are extended in the rightward circulating direction, and another line of the optical fibers are extended in the leftward circulating direction.

Moreover, alarm indicator signal (AIS) generators 23, 24, if the working traffic channel is disconnected, notify the device, which employs the protection traffic channel, of an alarm showing this purport. In this process, the AIS generators 23, 24 notify the device using the protection traffic channel at a non-use time of the protection traffic, that the protection traffic channel is not in the non-use state and can not be used any more. Namely, in the 1+1 configuration network, the protection traffic channel can be used unless any alarm is outputted from the AIS generators 23, 24.

As shown in FIG. 10, in the receiving-side system block 4-1, the protection traffic channels (Protect) 1-24 and the working traffic channels 1-24 are connected to a line switch 22A. As described above, in the 1+1 Line APS process, the same signal is transmitted to both of the working traffic channel and the protection traffic channel. Then, the transmission path qualities are compared with each other, the channel exhibiting a better transmission quality is selected by the line switch 22A on the OC-N basis, and the signal is outputted from this selected channel. A line switch 22B executes the same process for the channels 25-48.

Moreover, in the transmitting-side system block 14-1, the working traffic channels 1-24 are branched off to the protection traffic channels 1-24 by the line bridge 25. Further, the working traffic channels 25-48 are branched off to the protection traffic channels 25-48 by the line bridge 26. Thus, the transmitting-side system block 14-1, etc. generates the signals in the redundant configuration at the working traffic channels and at the protection traffic channels.

With the configuration described above, when the user conducts the setting of the cross-connect processing circuit 2, irrespective of the connecting relation to the system blocks 4-1 through 4-$m$ and the system blocks 14-1 through 14-$m$ each executing the Line APS process and irrespective of whether the processing thereof is done or not, the signals to the respective input terminals (having, e.g., the terminal numbers 1 through n) of the cross-connect processing circuit 2 correspond to the slots 3-1 through 3-$n$ (having, e.g., the slot number 1 through n) on the working traffic input side (the left side in FIGS. 7 and 9).

Further, the signals to the respective output terminals (having, e.g., the terminal numbers 1 through n) of the cross-connect processing circuit 2 correspond to the slots 3-1 through 3-$n$ (having, e.g., the slot number 1 through n) on the working traffic output side (the right side in FIGS. 7 and 9). Hence, the user is able to set the cross-connect processing circuit 2 on the basis of the slot number for identifying the slot.

Note that the first embodiment has exemplified the example in which the present terminal relay device 1 is applied to the terminal (1+1) configuration network. In a linear configuration where three or more pieces of terminal relay devices 1 are combined, the procedure is the same as the above-mentioned on condition that the signals are branched off into both of the working traffic channels and the protection traffic channels, and the selecting process is executed on the receiving side.

Namely, the terminal relay device 1 can be similarly applied to the linear configuration where three or more pieces of terminal relay devices 1 are linearly arranged and to the UPSR configuration where the signals are outputted in both of the east direction and west direction of the ring.

<Example of BLSR Application>

In the BLSR application also, it is possible to establish the connections between the slots and the system blocks and to actualize the setting of the cross-connect processing circuit 2 without being aware of the system blocks.

Figure 11:
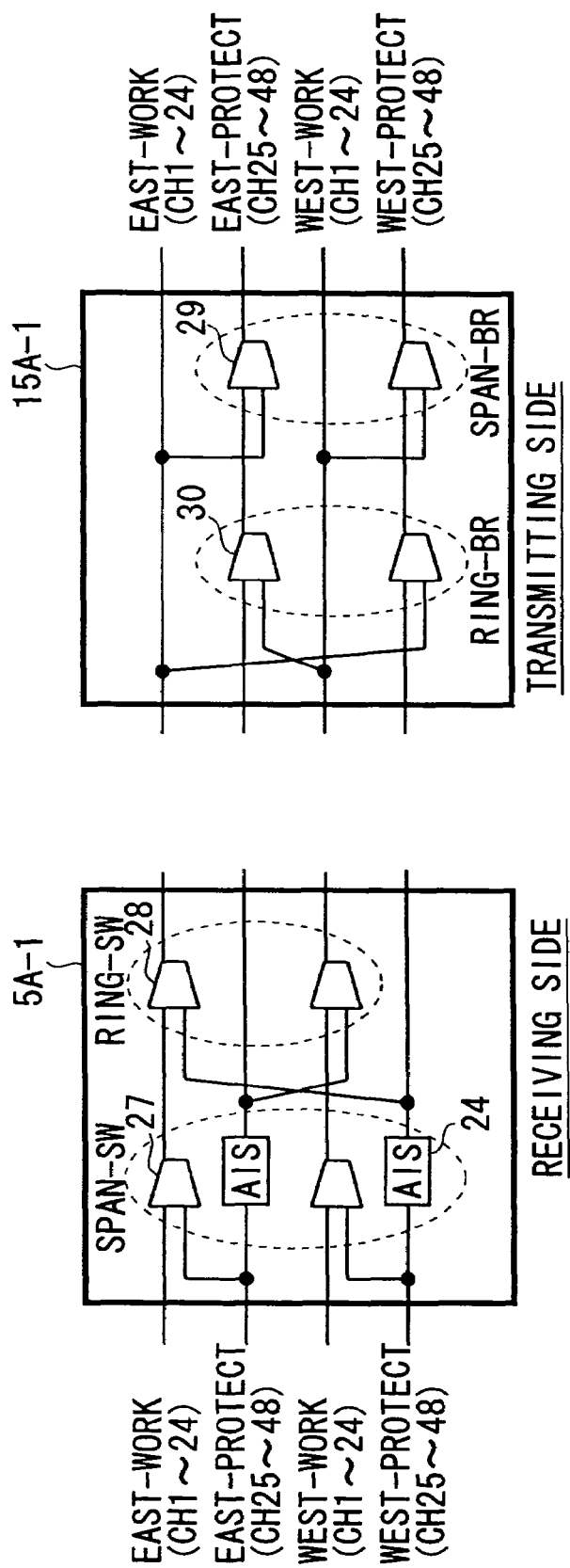
FIG. 11 is a view of a configuration when in a BLSR process within system blocks 5A-1 and 15A-1 in the 4-fiber BLSR.

FIG. 11 shows a configuration when in the BLSR process in system blocks 5A-1 and 15A-1 of a 4-fiber BLSR. In FIG. 11, the working traffic channels 1-24, the working traffic channels 25-48, the protection traffic channels 1-24, and the protection traffic channels 25-48, respectively correspond to different optical fibers. Then, the system blocks 5A-1, 15A-1, etc. executes the working traffic/protection traffic switchover control when the fault occurs in the transmission path.

As shown in FIG. 11, the assignment of the transmission paths (channels) in 4-line transmission paths of the BLSR is that a first line is assigned for an east working traffic (East-Work), a second line is assigned for an east protection traffic (East-Protect), a third line is assigned for a west working traffic (West-Work), and a fourth line is assigned for a west protection traffic (West-protect).

As shown in FIG. 11, the receiving-side system block 5A-1 has a span switch 27 between the east working traffic line and the east protection traffic line, and a ring switch 28 between the east working traffic line and the west protection traffic line.

The span switch 27 switches over a should-select channel on the OC-N basis between the east working traffic line and the east protection traffic line.

The ring switch 28 switches over a should-select channel on the OC-N basis between the east working traffic line and the west protection traffic line. This ring switch 28 executes a process of dropping, from the west side, the data that should be transmitted originally on the east side.

The transmitting-side system block 15A-1 has a span bridge 29 between the east working traffic line and the east protection traffic line, and a ring bridge 30 between the east working traffic line and the west protection traffic line.

The span bridge 29, if the fault occurs in the east working traffic channel, branches off the east working traffic signals to the east protection traffic line on the OC-N basis.

If the faults occur in both of the east working traffic line and the east protection traffic line, the ring bridge 30 switches over the east working traffic signals to the west protection traffic line on the OC-N basis. The ring bridge 30 effects a loopback transmission of the data that should be transmitted originally in the east direction back to the transmission path in the west direction.

<Application to Devices in Coexistence of Line APS and UPSR>

As shown in FIG. 7, the terminal (1+1) configuration and the BLSR configuration can coexist by switching over the 2-to-1 selector 10 anterior to the cross-connect processing circuit 2 and the 2-to-1 selector 20 anterior to the output-side slots 3-1 through 3-n for outputting to the output-side slots 3-1 through 3-n.

To be specific, with a combination of the 2-to-1 selections 10 and 20, the transmission paths in the Linear ADM configuration (or the terminal configuration) and the transmission paths in the BLSR configuration can be switched over on the OC-N (e.g., OC-48) basis. Therefore, according to the terminal relay device 1 in the first embodiment, the plurality of applications can be built up within the single device.

<Generalization to OC-N>

As explained above, for instance, one system block is configured based on an OC-48/2-fiber standard, wherein an OC-48/4-fiber BLSR configuration can be actualized by combining two system blocks, an OC-192/2-fiber (BLSR) configuration can be actualized by combining four system blocks, and an OC-192/4-fiber BLSR configuration can be actualized by combining 8 system blocks.

Note that in the case of the 2-fiber BLSR, the bands are allocated to the working traffic line and the protection traffic line within one fiber. In this case, the redundant configuration is actualized by the fibers on the east side and the west side. This configuration eliminates the necessity for the span switch 27 and the span bridge 29 for the redundancy of the working traffic line and the protection traffic line (this is the same with the west).

Other Modified Examples

The first embodiment has exemplified the example in which the present invention is embodied on the SONET/SDH. The embodiment of the present invention is not, however, limited to the SONET/SDH. Namely, the present invention can be embodied in the general type of relay devices each having the working traffic/protection traffic switchover function and the cross-connect processing function.

Second Embodiment

A terminal relay device in the network according to a second embodiment of the present invention will hereinafter be described with reference to the drawings in FIGS. 12 through 17. The discussion in the first embodiment has dealt with the configuration of the terminal relay device 1 in the network, which executes the 1+1 Line APS process and the BLSR process.

An explanation in the second embodiment is about a procedure of upgrading (which will hereinafter be called an in-service upgrade) the network in a serviceable state by use of the terminal relay device 1. The configuration and the functions of the terminal relay device 1 are the same as those in the first embodiment. Therefore, the same components are marked with the same numerals and symbols, and their explanations are omitted.

The in-service upgrade is categorized into two types. The first type is a case of increasing a physical transmission capacity (e.g., OC-12 is changed (upgraded) to OC-48) in the application built up at the present. Further, the second type is a case of changing the system application (e.g., the UPSR is changed (upgraded) to the BLSR) while the transmission capacity remains unchanged.

<Example of Upgrade from UPSR to BLSR>

Figure 12:
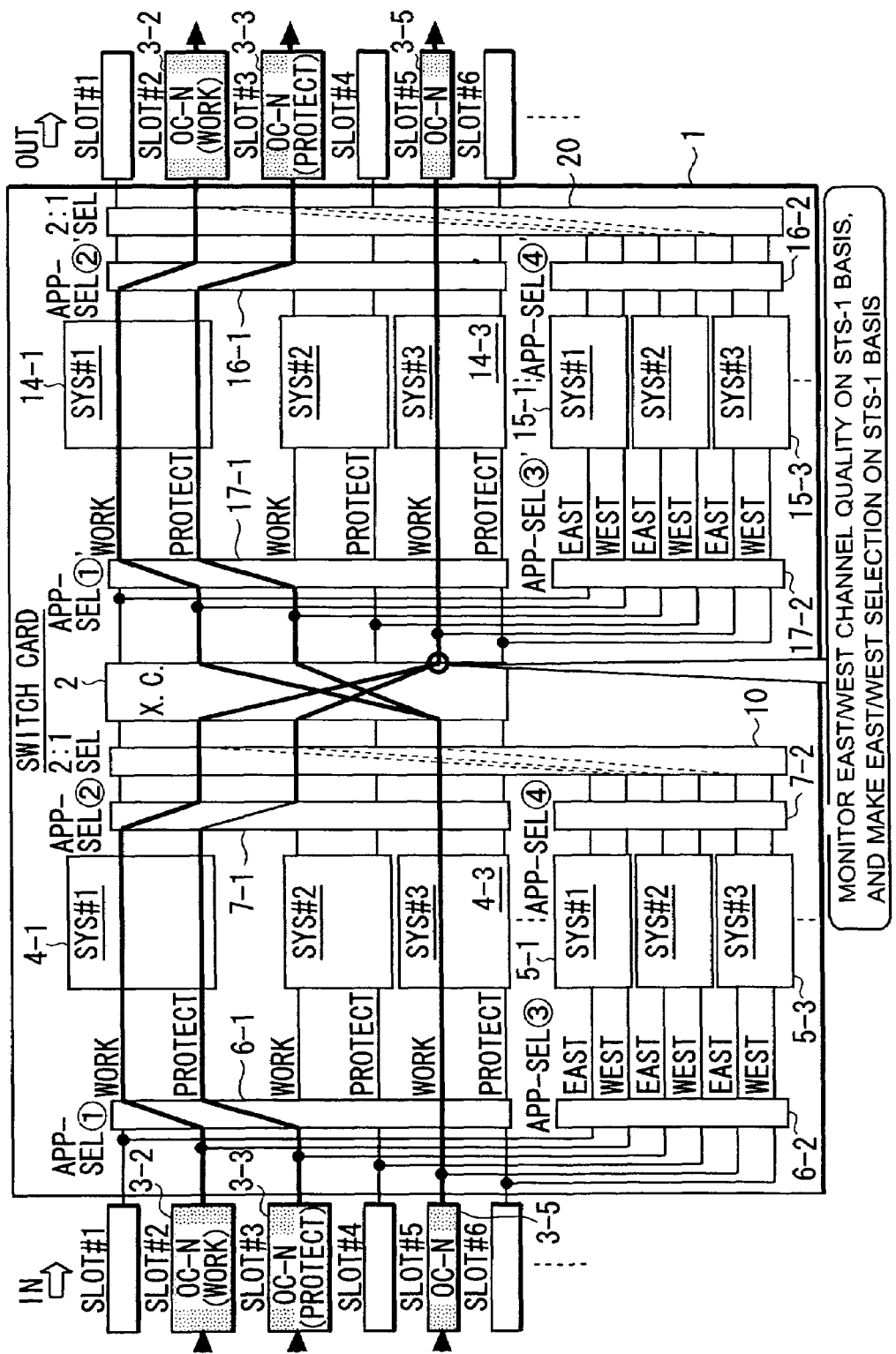
FIG. 12 is a view showing a procedure (1) for upgrading from UPSR to BLSR in a second embodiment of the present invention.
Figure 13:
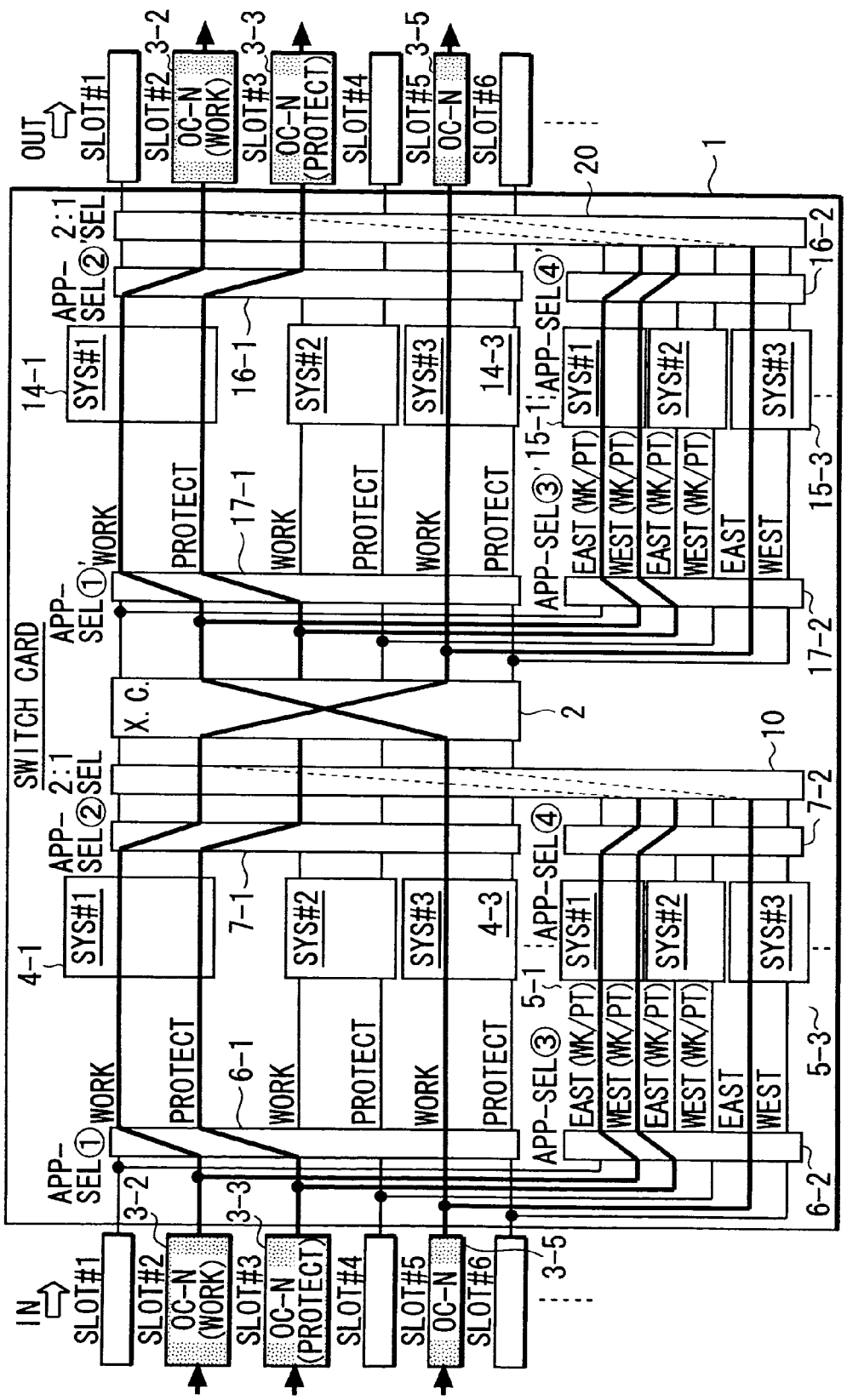
FIG. 13 is a view showing a procedure (2) for upgrading from the UPSR to the BLSR in the second embodiment of the present invention.
Figure 14:
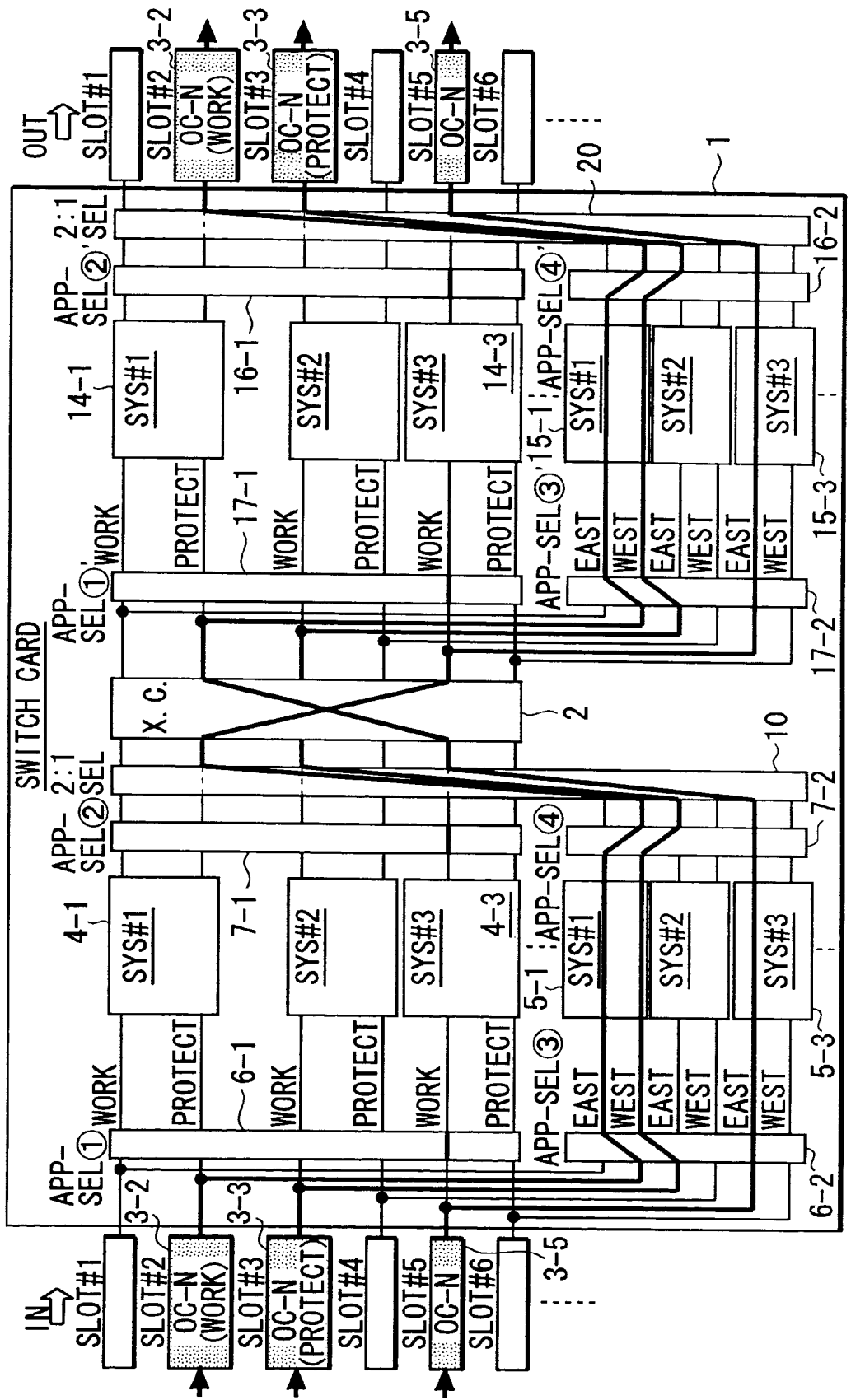
FIG. 14 is a view showing a procedure (3) for upgrading from the UPSR to the BLSR in the second embodiment of the present invention.

FIGS. 12 through 14 show a procedure of upgrading the application from the UPSR to BLSR by use of the present relay device 1.

FIG. 12 shows that the interface cards interfacing with the higher-level side are inserted into the slot 3-2 and the slot 3-3. Further, the interface card interfacing with the lower-level side is inserted into the slot 3-5.

Then, the same line switch as that in the first embodiment is provided in the system blocks 4-1, 4-3, etc., thereby actualizing the working traffic/protection traffic selection or the add from the lower-level side. Moreover, the same line bridge as that in the first embodiment is provided in the system blocks 14-1, 14-3, etc., thereby actualizing the signal output to both of the working traffic line and the protection traffic line or the drop into the lower-level side. With this configuration, the terminal relay device 1 configures a node in the UPSR ring. For example, the interface card in the slot-3-2 may be connected to the east side, and the interface card in the slot 3-3 may be connected to the west side. Note that in FIGS. 12 through 14, the system blocks 5-1, 5-3, etc. have the same configuration as that of the system block 5-1 on the receiving side shown in FIG. 11. Moreover, the system blocks 15-1, 15-3, etc. have the same configuration as that of the system block 15-1 on the transmission side shown in FIG. 11. The system blocks 5-1, 15-1, etc. provide, as in the case in FIG. 11, the BLSR application by use of the span switch, the ring switch, the span bridge and the ring bridge (in the case of the 2F-BLSR, neither the span switch nor the span bridge is employed.

Hereinafter, this UPSR is upgraded to the BLSR without stopping the service in accordance with the procedures shown in FIGS. 13 and 14.

At first, in FIG. 13, the transmission data from the slots 3-2, 3-3 and 3-5 are branched off and are connected to the system blocks 5-1, 5-3 on the BLSR side via the application selectors 6-2 and 7-2.

Further, the transmission data after being cross-connected are likewise connected to the system blocks 15-1, 15-3 via the application selectors 17-2 and 16-2.

Then, the BLSR-side data is sent through to the 2-to-1 selector 10 anterior (on the left side as viewed on the sheet surface in FIGS. 12 through 14) to the cross-connect processing circuit 2. Moreover, the BLSR-side data is sent through before the 2-to-1 selector 20 anterior to the output-side slots 3-2 etc., for outputting to the interface card of the slot 3-2, etc., thus configuring the BLSR system.

Next, on FIG. 14, the setting of the 2-to-1 selector 10 anterior to the cross-connect processing circuit 2 and the setting of the 2-to-1 selector 20 anterior to the output-side slots 3-2 etc., for outputting to the interface card, are switched over to the BLSR-side selection. The signals from both sides of the UPSR and the BLSR are sent through 2-to-1 selectors 10 and 20, and hence the switchover process can be easily executed.

With this processing, the upgrade from the UPSR to the BLSR is completed without stopping the service.

<Example of Upgrade from Linear ADM (1+1) Configuration to BLSR>

An example of in-service upgrade from the OC-N (e.g., (OC-48) Linear ADM (1+1) configuration to the OC-N/4-fiber BLSR will be explained. Herein, (1+1) implies that the fiber is employed the same number of times for the working traffic and for the protection traffic.

FIG. 15 shows a procedure of upgrading from the Linear ADM configuration to the 4-fiber BLSR. A network in the Linear ADM (1+1) configuration is illustrated in an upper part in FIG. 15.

This network is configured by connecting terminal relay devices 1A, 1B, 1C structuring nodes A, B, C by use of the transmission paths for the working traffic (Work) and the protection traffic (Protect). The terminal relay devices 1A, 1B, 1C have the same construction as that explained in the first embodiment discussed above.

As shown in FIG. 15, in the case of upgrading from the linear ADM configuration to the 4-fiber BLSR, the interface cards illustrated by half-tone dot meshing (shown by a character "Add" in FIG. 15) are added to the node A and the node C, a fiber F10 is connected between the node A and the node C, and, when setting each node in a BLSR mode, the upgrade is thus completed. In the case of upgrading to the 4-fiber BLSR, however, this upgrade requires switching over the application selector for establishing the connections to the system blocks.

Figures 16, 16A, 16B:
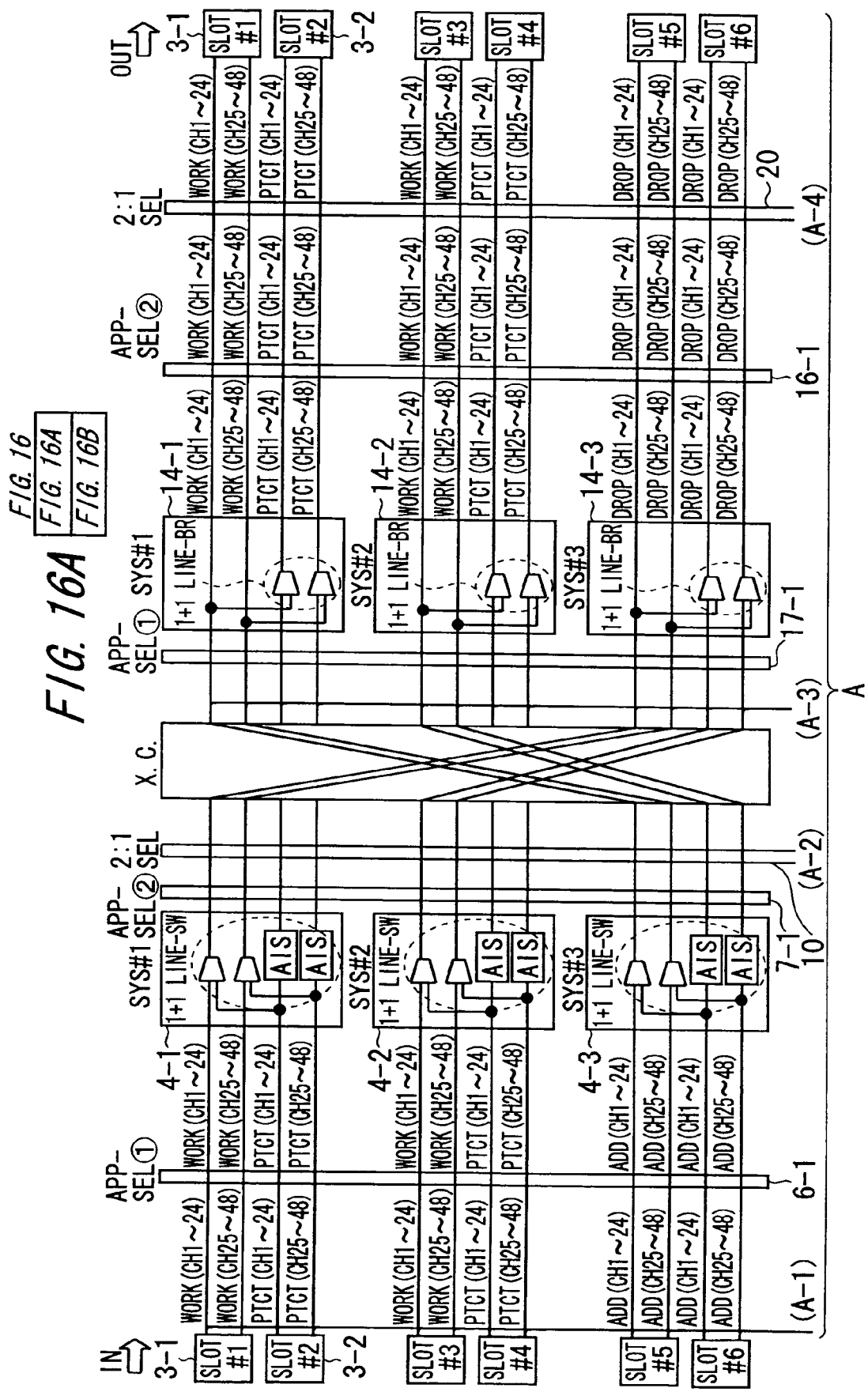
FIGS. 16A and 16B show a detailed procedure (1) for upgrading from the Linear ADM configuration to the 4-fiber BLSR.
Figure 16B:
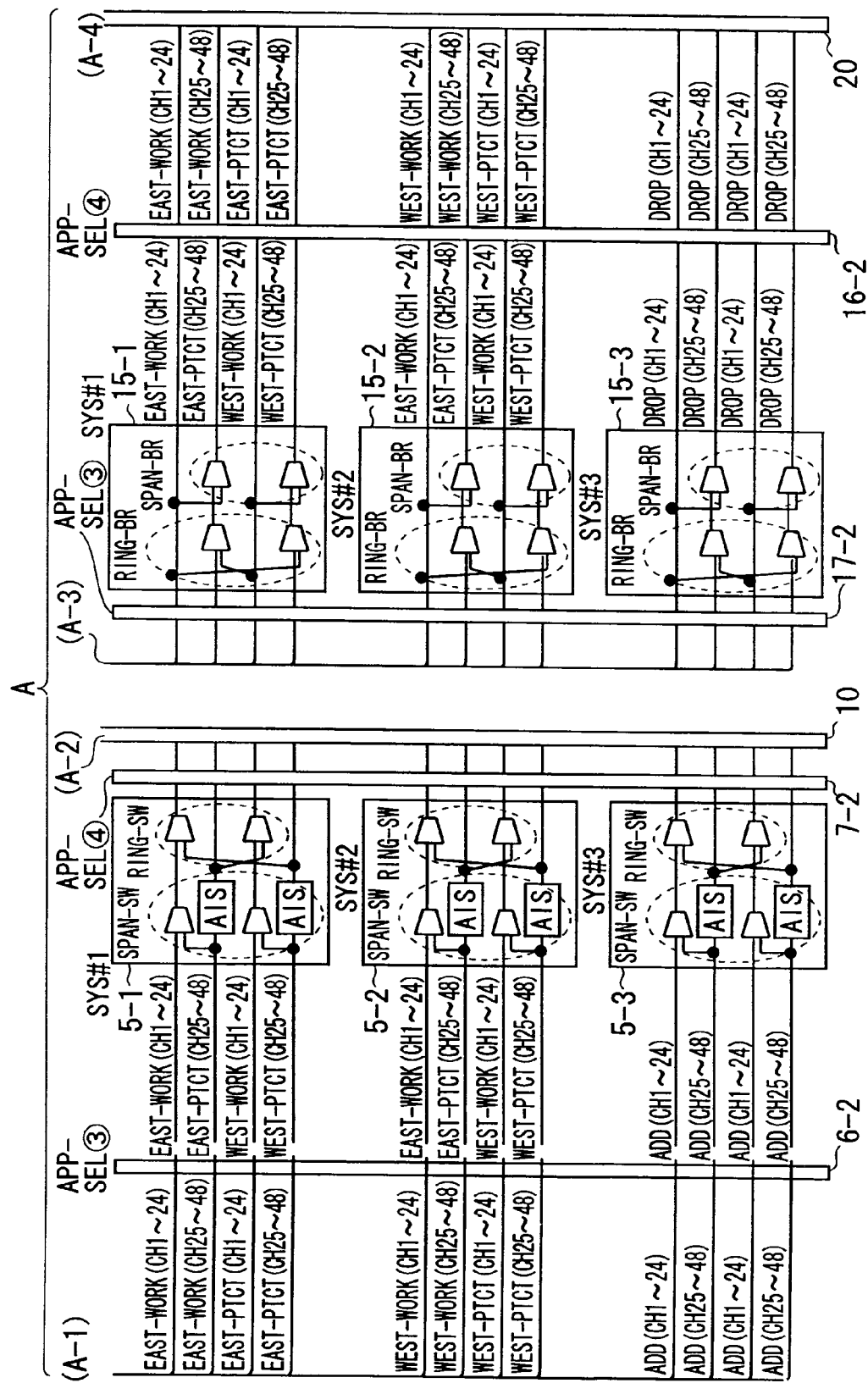
Figure 17A:
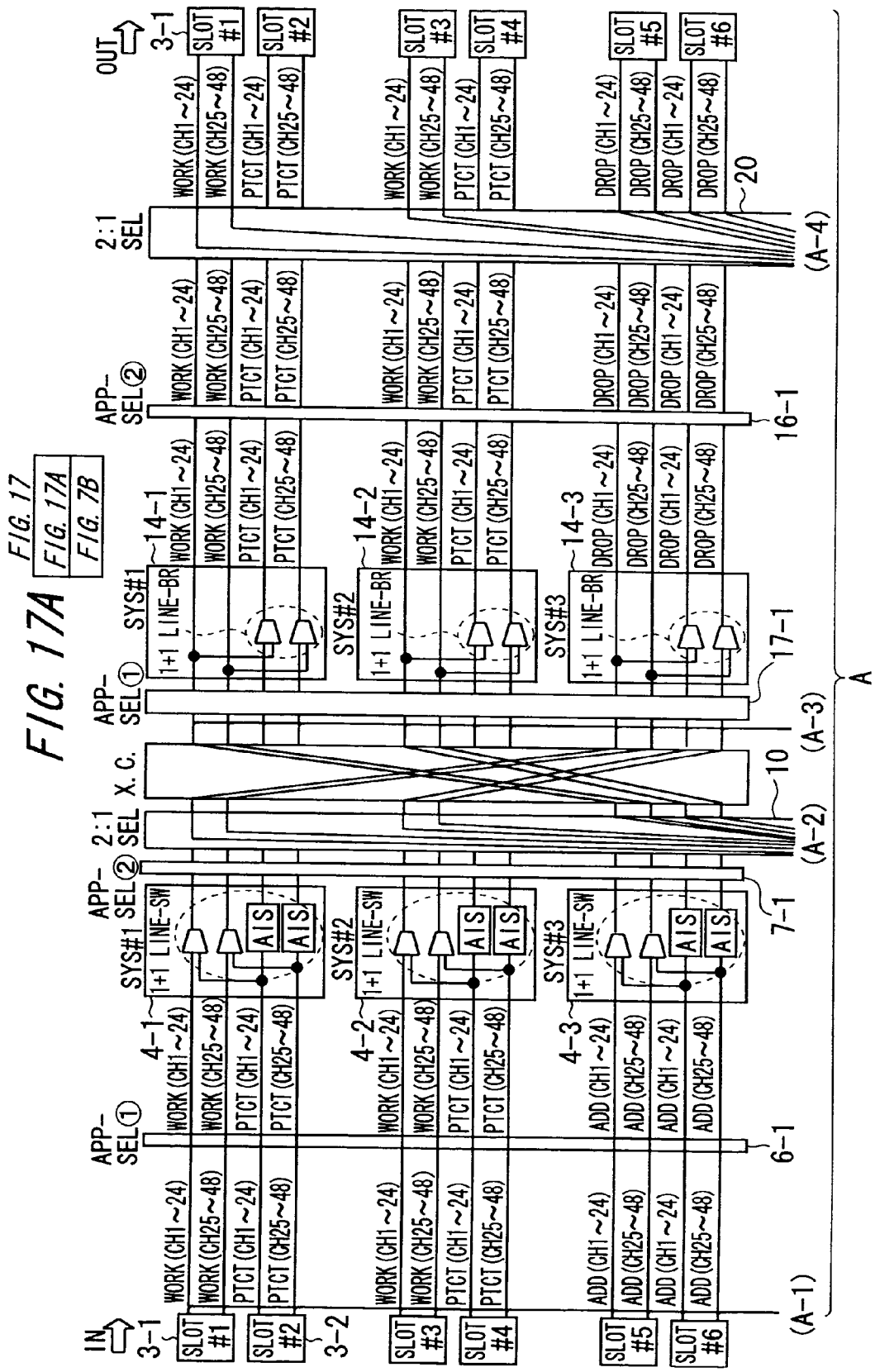
FIGS. 17A and 17B show a detailed procedure (2) for upgrading from the Linear ADM configuration to the 4-fiber BLSR.
Figure 17B:
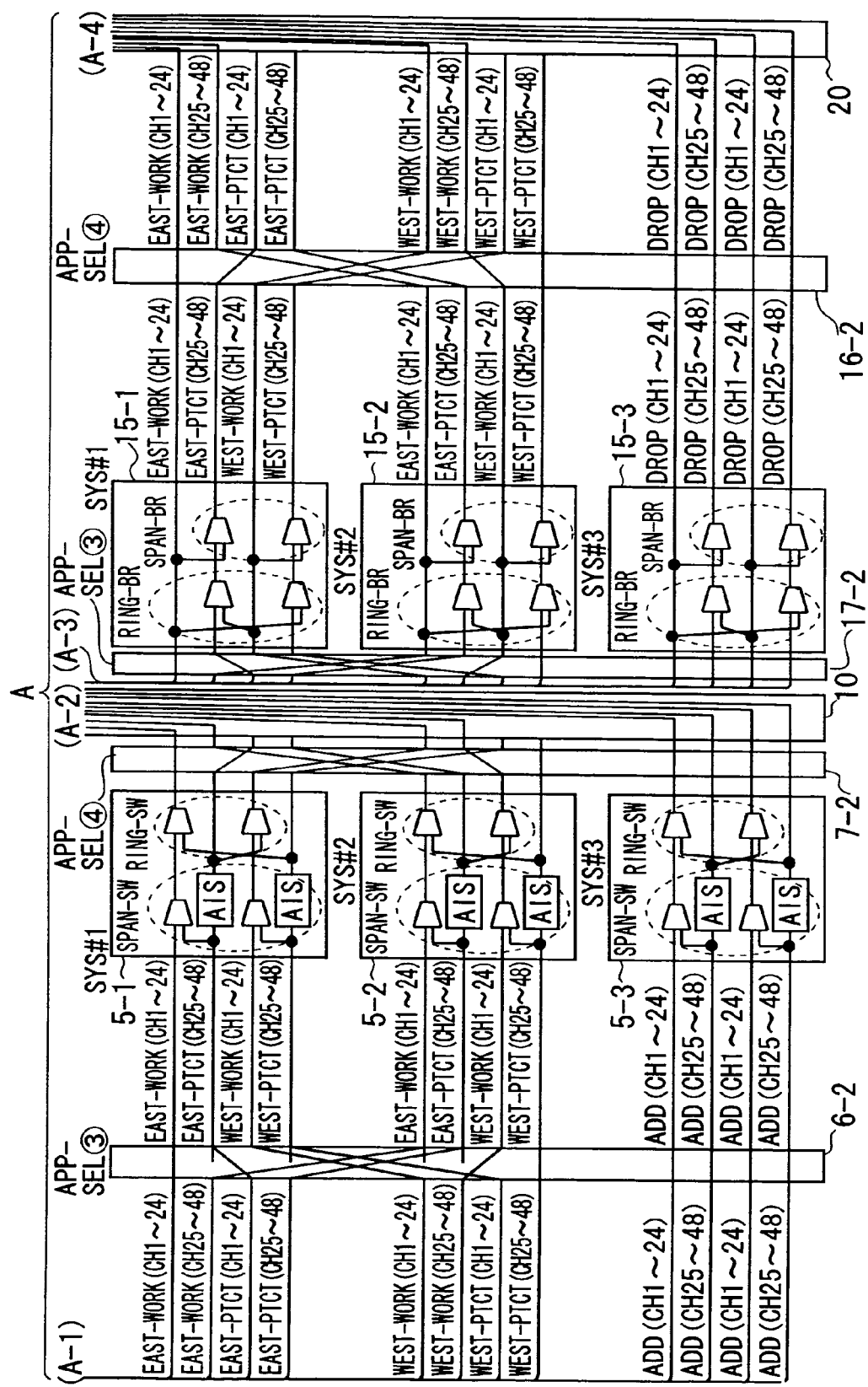

This switchover is shown in FIGS. 16A, 16B and FIGS. 17A, 17B. FIGS. 16A and 16B show a setting content of the application of the node B before upgrading. Further, FIGS. 17A and 17B show the setting of the application when in the 4-fiber BLSR.

Throughout these drawings, PTCT represents the protection traffic (Protect). Further, WORK represents the working traffic. Moreover, throughout these drawings, points shown by (A-1), (A-2), (A-3) and (A-4) indicate connecting points.

As shown in FIGS. 16A and 16B, the terminal relay device 1B, etc. in the second embodiment has application selectors 6-1, 7-1 in front and in rear of the system blocks 4-1, 4-2, 4-3, etc. These application selectors 6-1, 7-1 connect, on the input side (indicated by an arrow IN), the working traffic signals inputted to the slots 3-1, 3-2, etc. to the input-side terminals of the cross-connect processing circuit 2 in an as-is corresponding relation. This operation is the same as that described in the first embodiment. Further, a relation between the output-side terminals of the cross-connect processing circuit 2 and the working signals outputted from the slots 3-1, 3-2, etc. is likewise maintained by the application selectors 17-1, 16-1 on the output side (indicated by an arrow OUT).

Moreover, generally, an array of the signals at the output-side terminals of the system blocks 5-1, 5-2, 5-3, etc. at the time of the 4-fiber BLSR setting is not coincident with a signal array in the system blocks 4-1, 4-2, 4-3 at the time of the 1+1 Linear ADM setting. By the operations of the application selectors 6-2 and 7-2, the array of the signals at the output-side terminals of the system blocks 5-1, 5-2, 5-3 is returned to the signal array at the input-side (indicated by the arrow IN) slots. This operation is the same as that described in the first embodiment.

Hence, the signals at the output-side terminals of the application selectors 7-1 and 7-2 correspond to the input-side slots 3-1, 3-2, etc. irrespective of whether the 1+1 Linear ADM exists or not and whether the BLSR process is executed or not.

This corresponding relation is similarly kept between the output-side terminals of the cross-connect processing circuit 2 and the output-side (indicated by the arrow OUT) slots 3-1, 3-2.

From what has been discussed so far, the application in the present state maintains the in-service state even when performing the respective setting for the new application by taking a parallel configuration of the Linear ADM/UPSR line and the BLSR line. Then, just when getting ready for the new application, the upgrade to the new application can be instantaneously actualized by switching over the 2-to-1 selectors 10 and 20. Then, deterioration of the transmission quality in the processing of upgrading can be minimized.

If not provided with the application selectors 6-1, 6-2, 7-1, 7-2, 16-1, 16-2, 17-1, 17-2, etc. in front and in rear of the cross-connects, it follows that the cross-connect processing circuit 2 is set based on a system block standard. The "system block standard" connotes a necessity of distinguishing an array of the output signals of the system blocks.

Therefore, on the occasion of upgrading from the 1+1 Linear ADM to the 4-fiber BLSR, the cross-connects need rearranging. In this case, the disconnection of the main signals occurs.

As a means for avoiding this disconnection, the present terminal relay device 1A, etc. is provided with the application selectors 6-1, 6-2, 7-1, 7-2, 16-1, 16-2, 17-1, 17-2 in front and in rear of the cross-connects. With this arrangement, the cross-connects can be set based on the slot standard. Accordingly, as shown in FIGS. 16A, 16b and FIGS. 17A, 17B, the setting of the cross-connect circuit 2 does not require rearranging when upgrading from the Linear ADM to the 4-fiber BLSR, and the disconnection of the main signals can be avoided.

Modified Examples

The second embodiment discussed above has exemplified the example in which the present invention is embodied on the SONET/SDH. The embodiment of the present invention is not, however, limited to the SONET/SDH. Namely, the present invention can be embodied in the general type of relay devices each having the working traffic/protection traffic switchover function and the cross-connect processing function.

Third Embodiment

A terminal relay device in the network according to a third embodiment of the present invention will hereinafter be explained with reference to the drawings in FIGS. 18 through 23. The discussion in the first embodiment has dealt with the configuration of the terminal relay device capable of flexibly setting the 1+1 Linear APS, the UPSR and the BLSR. Furthermore, the second embodiment has given the explanation of the procedure of upgrading the network without stopping the service.

A description in the third embodiment is about the terminal relay device capable of flexibly taking correspondence between the working traffic channels and the protection traffic channels in the BLSR.

In the conventional BLSR network, the data sent from an initial node is transferred via an intermediate node to a terminal node. Then, in case a saving operation (recovery) occurs due to a fault, the data is transferred to the terminal node along a path different from a normal operation path.

In this case, generally, the timeslot at the initial node and the working traffic/protection traffic timeslots at the terminal node are set in a relation fixed in a predetermined relation. The relation between the working traffic timeslot and the protection traffic timeslot is fixed, thereby making it possible to assure the connection after changing the path with respect to whatever timeslot, i.e., whatever working traffic channel. This type of network does not, however, allow an exchange (cross-connecting) of the usage timeslots at an intermediate through-node in the normal operating state.

The terminal relay device in the third embodiment allows the exchange of the timeslots at the intermediate through-node and, in addition, actualizes the saving operation when the fault occurs.

Generally, in the data to be transmitted, a path ID designating a node unique number and a channel number is defined on the initial node. The path ID is specified in, e.g., the SONET/SDH, and is information used by software on a higher-order layer in order to distinguish between the nodes performing the communications. In the third embodiment, this path ID is diverted mainly to recognition of the timeslot.

The path ID is defined by overhead bytes (overhead field) and is thus transferred. In the intermediate node, also in the case where the timeslots are cross-connected, the path ID is transmitted together with the channel transmission data. Therefore, even when the timeslots are changed, it is possible to recognize the pre-change path and to confirm the connection by monitoring this path ID at the terminal node.

In the third embodiment, the path ID is used for judging whether or not the data of the receiving channel saved by the saving method in the BLSR is received by a different channel. Namely, it is judged from the path ID in the terminal node which channel the data received at the normal operation time is received by after being saved.

That is, in the third embodiment, if the timeslots are changed, it is confirmed by the path ID which timeslot the data in the normal operation is received by. From a viewpoint of preventing the mis-connection, the unique path ID must be defined within the BLSR.

BLSR line saving in the third embodiment, as conventionally done, involves executing the BLSR ring switching procedure. To be specific, the terminal relay device in the third embodiment effects the loopback (of the data stream) when the fault occurs, whereby the transmission path is switched over to the protection traffic line in the reversed direction. If the cross-connect setting is done at the intermediate node when in the working traffic line setting, the communications between the nodes are performable, and nevertheless there might be a case in which the saving can not be done because of the different receiving timeslots.

Figure 18:
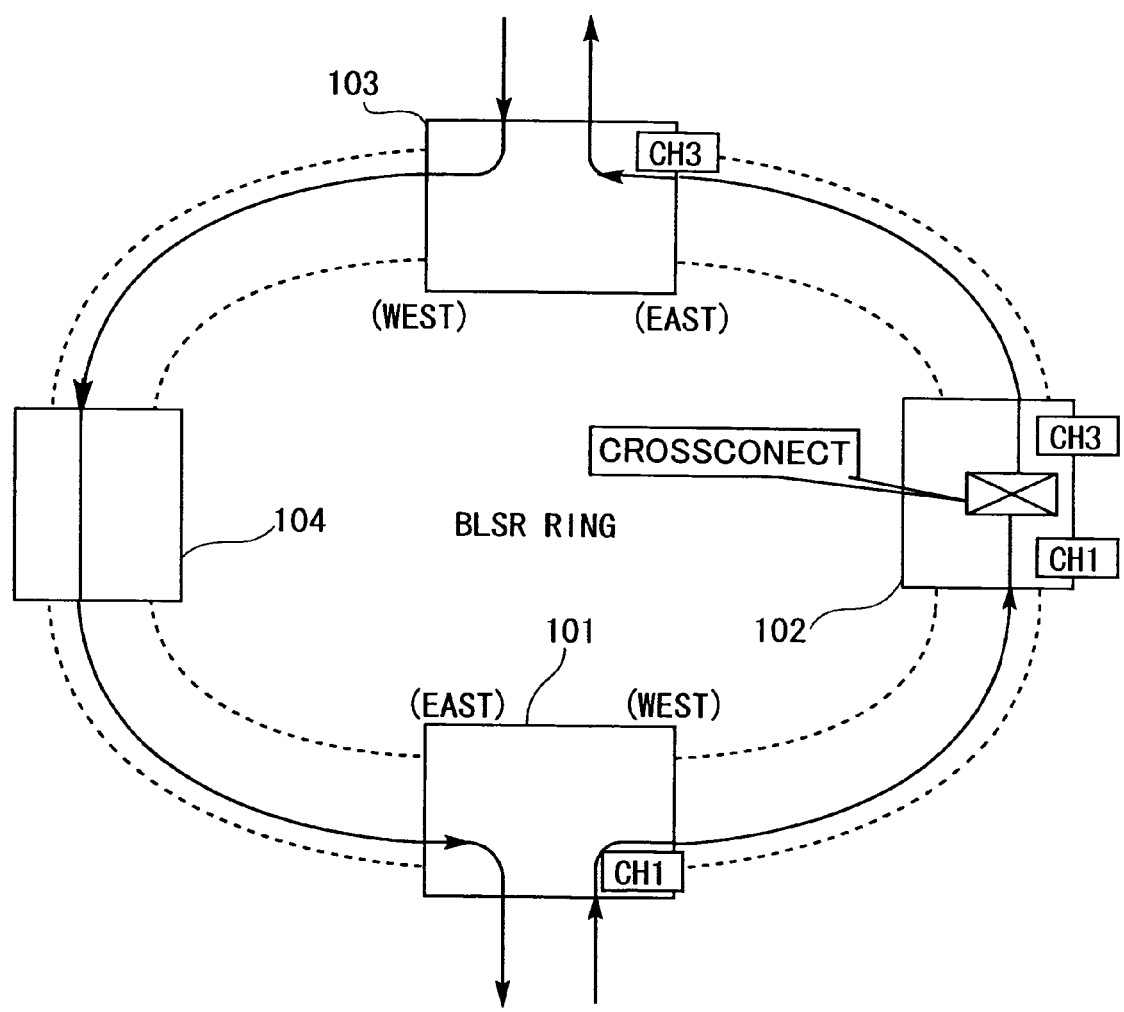
FIG. 18 is a view showing the BLSR according to a third embodiment of the present invention.

FIG. 18 shows a BLSR configuration including terminal relay devices 101, 102, 103 and 104 according to the third embodiment. In FIG. 18, the terminal relay device 101 transmits the data via the channel 1 to the terminal relay device 103. The channel 1 is changed to the channel 3 in the terminal relay device 102. Accordingly, the terminal relay device 103 serving as a receiving node drops the channel 3 into the lower-level side.

Figure 19:
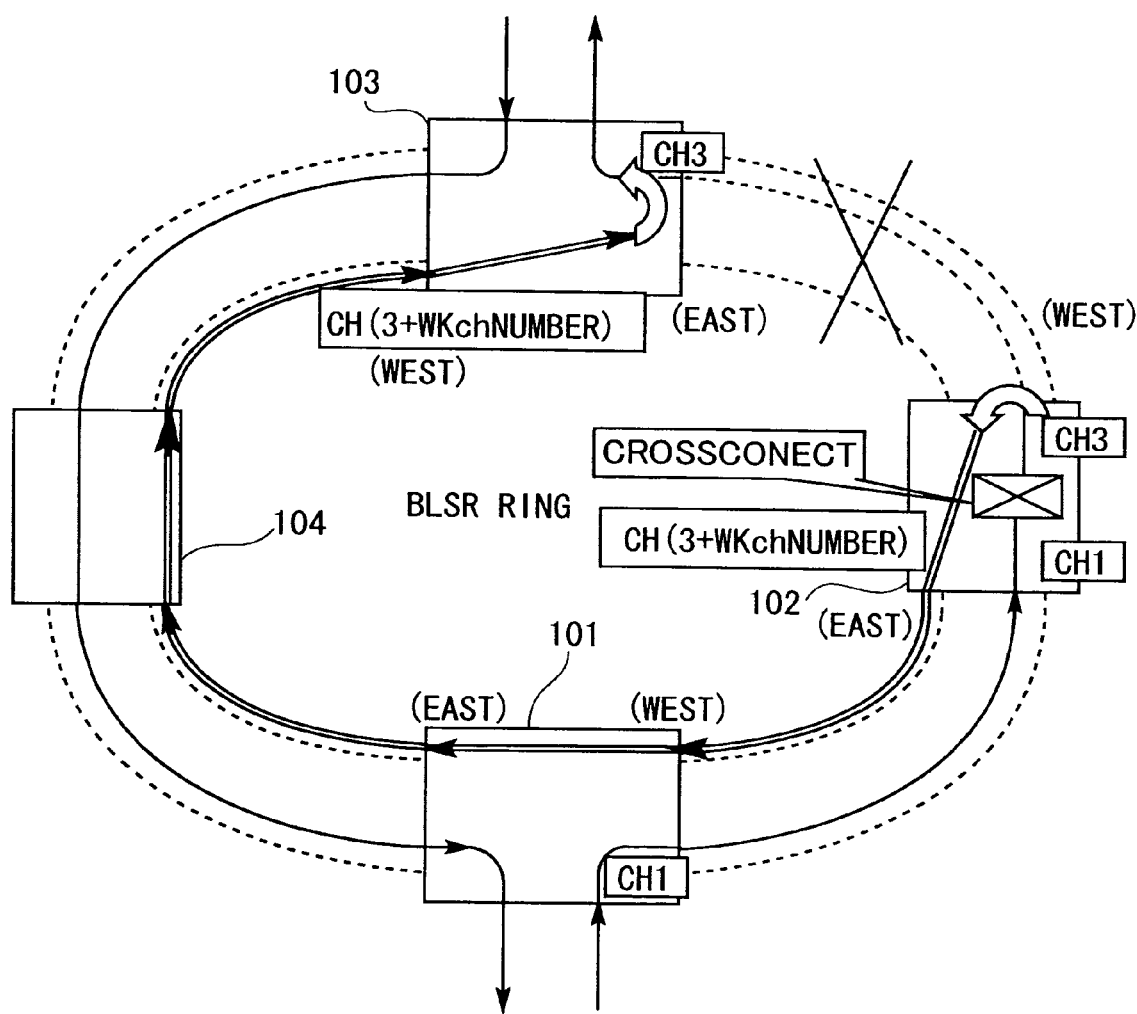
FIG. 19 is a view showing a state where a single fault occurs in the BLSR.

FIG. 19 shows a state where a single fault occurs. Herein, a failed point is indicated by a mark "X". As shown in FIG. 19, when the single fault occurs, the handling timeslots are the same before and after the fault (the channels in front and in rear of the failed point are the channels 3). Therefore, even when effecting the loopback for saving, the timeslot before saving is connected to the same timeslot of the connection target node, whereby the saving can be done by the conventional method. Namely, the terminal relay device 102 anterior to the failed point judges that the data can not be transmitted in the forward direction (the west direction), and loops the data transmission back in the east direction. The data looped back at the channel (channel 3) reaches the terminal relay device 104 through the terminal relay devices 101 and 104. The terminal relay device 103 may drop, from the west side, the same channel as the channel before the occurrence of the fault.

Note that the protection traffic channel for use is determined by a saving procedure specified in, e.g., the SONET/SDH. In the third embodiment, this protection traffic channel is shown as [CH3+WKch] in FIG. 19.

Figure 20:
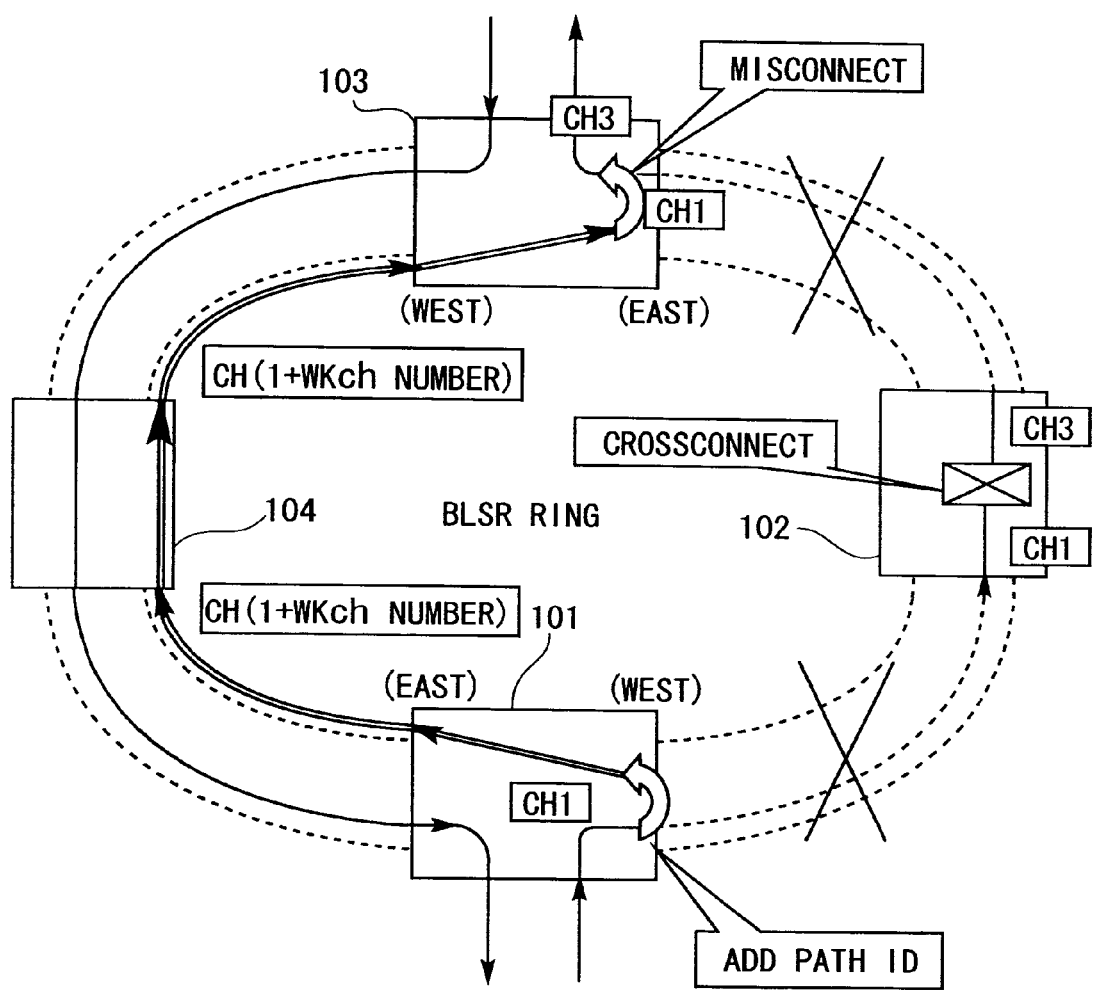
FIG. 20 is a view showing a state where multiple faults occur in the BLSR.

FIG. 20 shows an example of multiple faults. Herein, the failed points are likewise marked with "X". As shown in FIG. 20, when the multiple faults (such as fiber faults on a plurality of paths, node faults) occur, there comes out an intermediate node getting isolated due to the faults. In the example in FIG. 20, the isolated node is the terminal relay device 102. Further, in this terminal relay device 102, the channel exchange, i.e., the timeslot exchange, is conducted.

Thus, when the data is cross-connected to other timeslot in the isolated node, a fault neighboring node is unable to recognize this cross-connect setting. Accordingly, if executing the loopback that has hitherto been conceived as the normal saving measure, the data to be looped back can not be saved as when performing the normal operation.

This is because the cross-connecting of the through-data, which is executed in the isolated node, can not be automatically recognized and the different timeslots are connected to each other.

For preventing this mis-connection, the data receiving node (the terminal relay device 103 in FIG. 20) may detect the path ID when receiving the loopback data. The data receiving node in the third embodiment compares the path ID received when in the normal operation with the path ID received when under the loopback control, thereby executing the saving.

Figure 21:
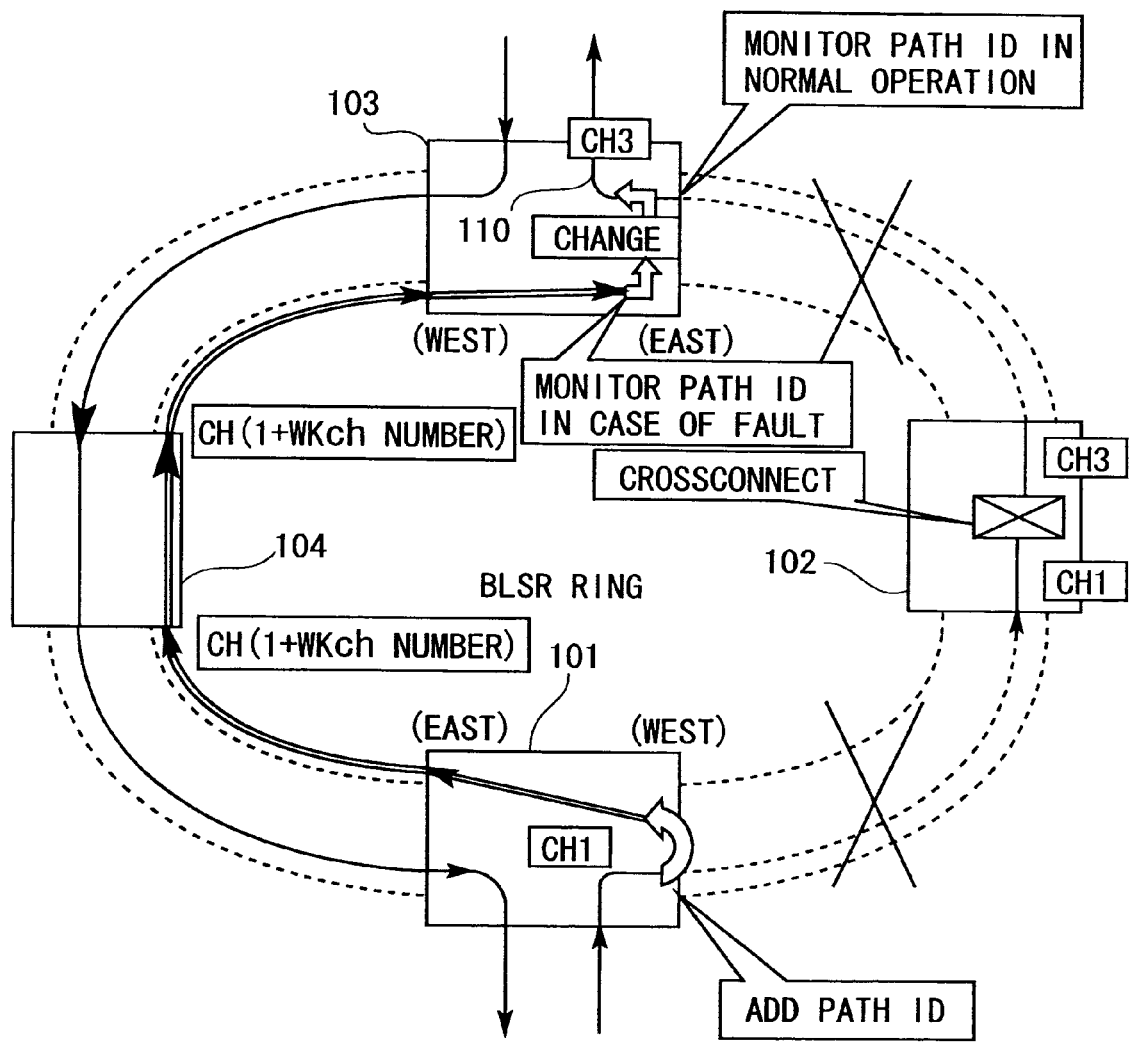
FIG. 21 is a view showing an example of a process of saving from the multiple faults in the BLSR.

FIG. 21 shows an outline of the saving process. This terminal relay device 103, in the case of receiving the same path ID at the same timeslot before and the after the fault, does not exchange the timeslot. Whereas if the pre-fault path ID and the post-fault path ID prove different as a result of the comparison, as shown in FIG. 21, the terminal relay device 103 exchanges the timeslot before execution by a loopback selector 110. With this exchange, the data can be received from the timeslot having the pre-fault path ID.

Squelch control employing a squelch table has hitherto been conducted for preventing the mis-connection of the line. When the multiple faults occur, however, the squelch control can not be utilized for saving the communicable cross-connected data. Even such a path, which can not be saved by employing the conventional squelch control, can be saved if the path ID is detected and the cross-connecting is done on the receiving side.

Figure 22:
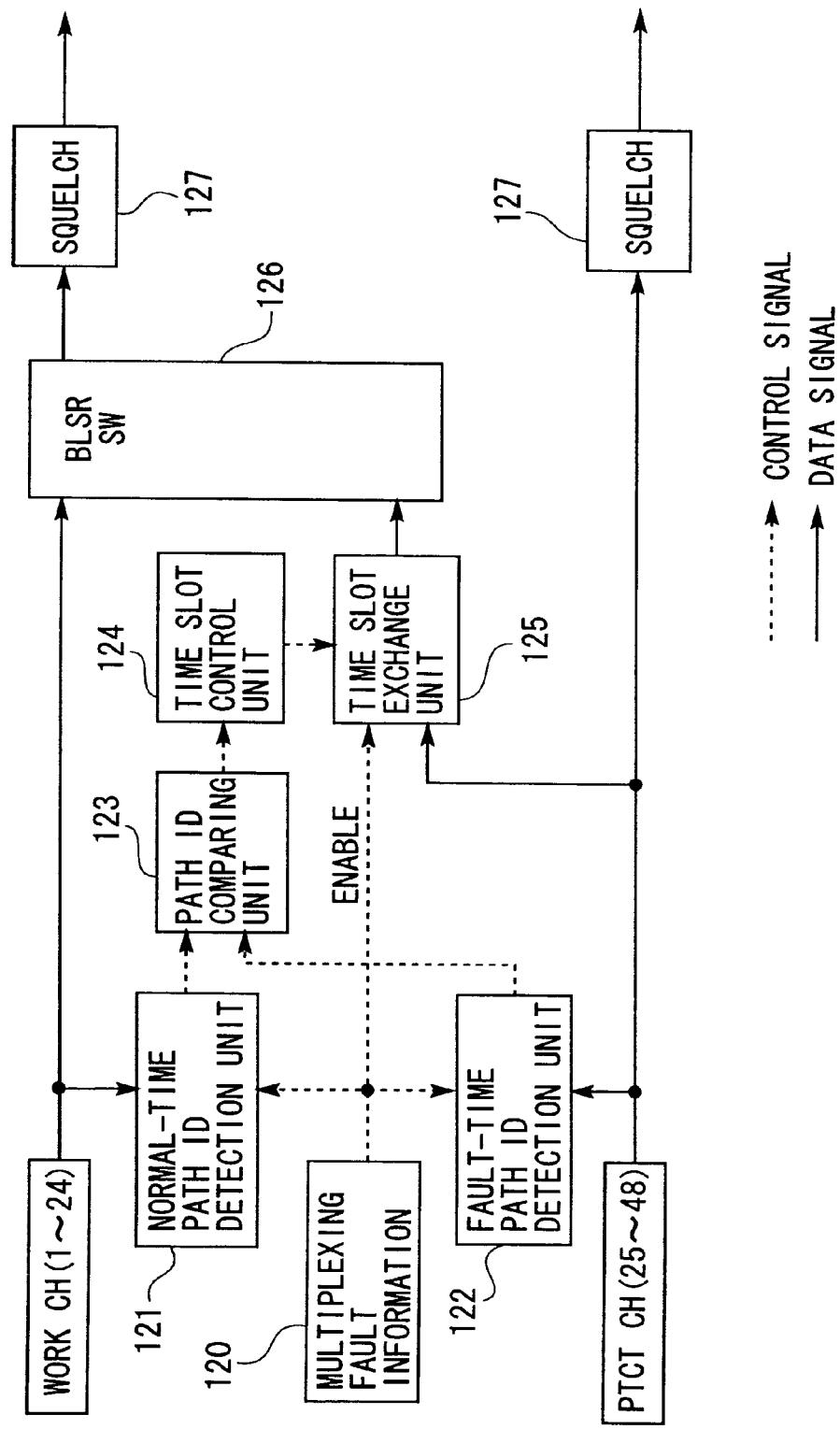
FIG. 22 is a block diagram of internal functions of a circuit for executing a path ID detection process.

FIG. 22 shows internal function blocks of the circuit for executing the path ID detection process. This circuit is mounted (packaged) within the receiving-side system block 5A-1 shown in FIG. 11.

As shown in FIG. 22, this system block is, on the assumption of, e.g., the IC-48/2F-BLSR, connected to the working traffic channels 1 through 24, the protection traffic channels 25 through 48 and a multiple fault information channel 120. Further, in FIG. 22, solid line arrows represent the data signals (the signals transmitted through the respective channels), while dotted-line arrows indicate control signals.

This system block includes a normal-time path ID detection unit 121, a fault-time path ID detection unit 122, a path ID comparing unit 123, a timeslot comparing unit 124, a timeslot exchange unit 125, a BLSR switch 126 and a squelch management unit 127.

The normal-time path ID detection unit 121 detects a path ID in the data inputted from the working traffic timeslot (ch1-24) at the normal time, and retains the ID. Then, the normal-time path ID detection unit 121, when the faults occur (when multiple fault information is inputted), performs a retaining operation so that the retained path ID is not changed.

The fault-time path ID detection unit 123 detects, with a piece of multiple fault occurrence information given, a path ID in the data inputted from a protection traffic timeslot (ch25-48), and retains this path ID. Other than when the faults occur (when the multiple fault information is inputted), however, the fault-time path ID detection unit 123 retains a path ID undetected code.

The path ID required is the path ID of the channels 1 through 24 on the working traffic side in the normal operation state. Further, when the multiple faults occur, there is a necessity of monitoring the path ID of the protection traffic channels 25 through 48.

The states at the normal time and at the fault occurrence time can be recognized by using ring switch information employed for the saving in the BLSR. The present circuit employs this ring switch information as multiple fault information. The ring switch information is, for example, information indicating a switchover state of the ring switch 28 for switching over the receiving-side channels to the working traffic line and the protection traffic line shown in FIG. 11 in the first embodiment.

When notified of execution of the saving through this ring switch information, the path ID information of the working traffic channels 1-24, which is stored in the normal time path ID detection unit 121, becomes unchangeable. On the other hand, the path ID received via the protection traffic channels 25-48 is detected by the fault-time path ID detection unit 123. Then, the path ID in the normal-time path ID detection unit 121 is compared with the path ID received via the protection traffic channels 25-48.

Note that in the case of saving in the BLSR where the through-node like the conventional node does not exchange the timeslot, it follows that the same data is received by the working traffic channel 1 and by the protection traffic channel 25. Such an inflexible channel configuration does not need the path ID detection as in the third embodiment.

The path ID comparing unit 123 compares, when the multiple faults occur, the path ID retained by the normal-time path ID detection unit 121 with the path ID retained by the fault-time path ID detection unit 122. Hereat, the path ID coincident with the path ID retained in each timeslot position of the normal-time path ID detection unit 121 is detected from the path ID detected when the faults occur.

The path ID comparing unit 123 inputs a result of this comparison to the timeslot control unit 124. The timeslot control unit 124 controls, based on the result of this comparison, the timeslot exchange unit 125.

The timeslot exchange unit 125 gets enabled when the multiple fault information 120 is inputted, and exchanges the protection traffic channels 25-48 in accordance with an instruction given from the timeslot control unit 124. The thus-exchanged channels are inputted to the BLSR switch 126. Herein, the BLSR switch 126 is, e.g., the ring switch 28 as a corresponding switch in FIG. 11.

Figure 23:
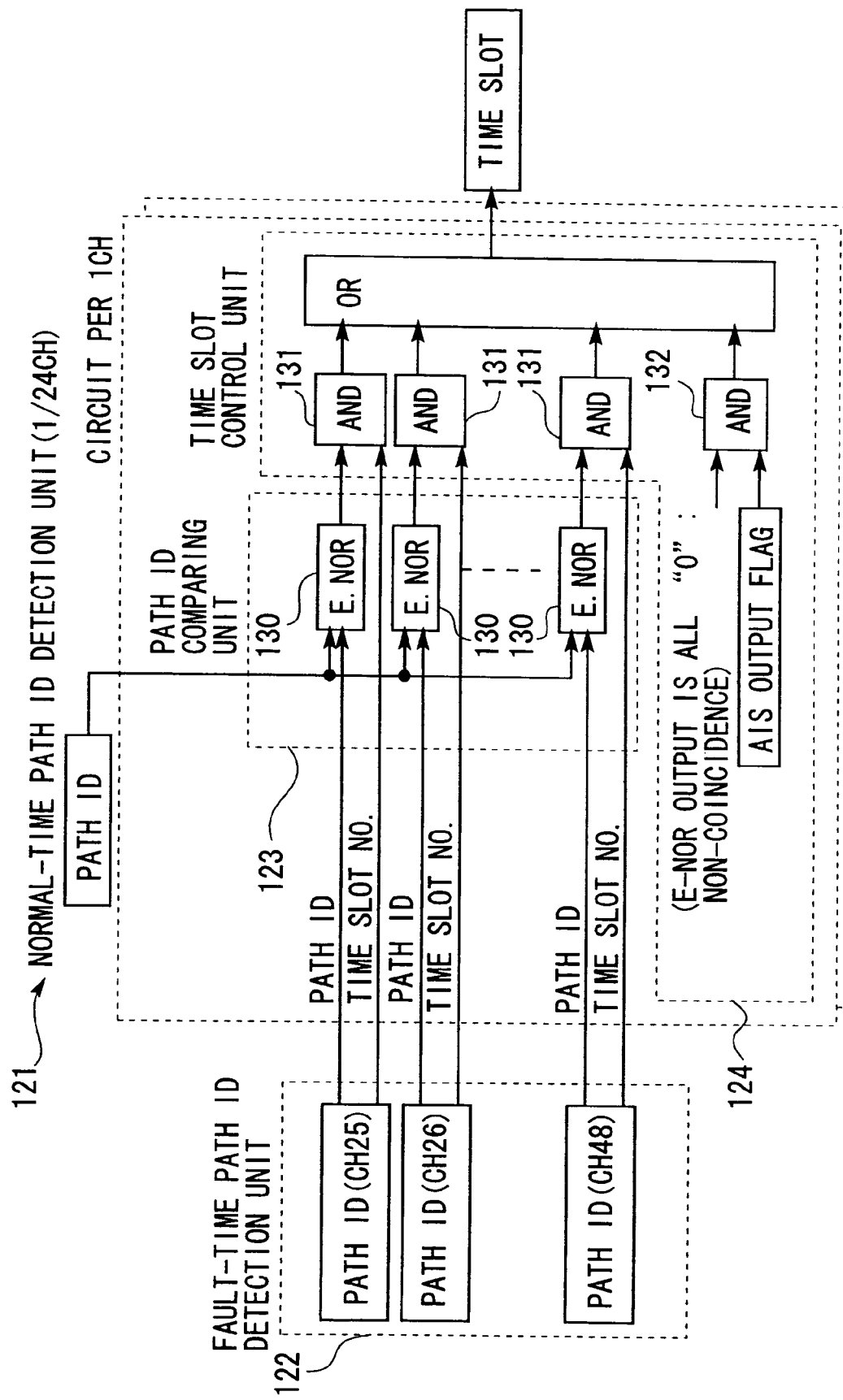
FIG. 23 is a view of a construction of circuits of a path ID comparing unit 123 and a timeslot control unit 124.

FIG. 23 shows a configuration of circuits of the path ID comparing unit 123 and the timeslot control unit 124. The path ID comparing unit 123 compares the path ID detected by the normal-time path ID detection unit 121, e.g., a path ID for identifying the timeslot of the channel 1 with the path ID retained by the fault-time path ID detection unit 122 (an E-NOR circuit 130 in FIG. 23). In the case shown in FIG. 23, an output of the E-NOR circuit 130 with the path IDs coincident with each other becomes "true".

If none of the coincident path ID is detected as the result of the comparison, the undetected state is recognized. The timeslot control unit 124, as the output of the E-NOR circuit 130 is "true", associates the timeslot stored in the normal-time path ID detection unit 121 with the timeslot detected by the fault-time path ID detection unit 122.

Namely, depending on the output of the E-NOR circuit 130 with the path IDs coincident with each other, the fault-time channel is selected via an AND circuit 131. Moreover, if the coincident path ID does not exist, an AIS output flag is set via the AND circuit 132.

The timeslot exchange unit 125 in FIG. 22 exchanges the timeslot on the basis of the selection described above. Further, when the AIS output flag is set, the timeslot exchange unit 125 outputs an AIS signal.

As discussed above, according to the terminal relay devices 101, etc. in the third embodiment, the through-node allows the exchange of the timeslot, and then the saving from the multiple faults occurred is actualized. Accordingly, the setting of the timeslot in the through-node becomes flexible, and at the same time the reliability in the BLSR-based system is maintained.

Fourth Embodiment

A terminal relay device in the network according to a fourth embodiment of the present invention will be described with reference to the drawings in FIGS. 24 through 26. The discussion in the first embodiment has dealt with the configuration of the terminal relay device 1 in the network, which executes the 1+1 Line APS process and the BLSR process. In this case, the application selectors 6-1, etc., the system blocks 4-1, etc., the 2-to-1 selectors 10, etc. in the first embodiment directly switch over the main signals on the transmission path.

Thus, the general construction of the conventional terminal relay device is that the circuits for executing the applications of the Line APS, the BLSR, etc. are provided in front and in rear of the cross-connect processing circuit, whereby the main signals are directly operated.

The fourth embodiment involves providing a control circuit for processing a piece of identifying information (which will hereinafter be called a path code) of the control signal independently of the main signals. This control circuit executes the Line APS process, the BLSR process, etc. together with the cross-connect process with respect to the path code. Then, there is acquired an associated relation between the path code inputted to this control circuit and the path code outputted from the control circuit.

This path code associated relation shows which output channel the input channel to the terminal relay device should be connected with. This control circuit sets the main signals of the cross-connect processing circuit according to this path code associated relation.

Conventional Example

Figure 24:
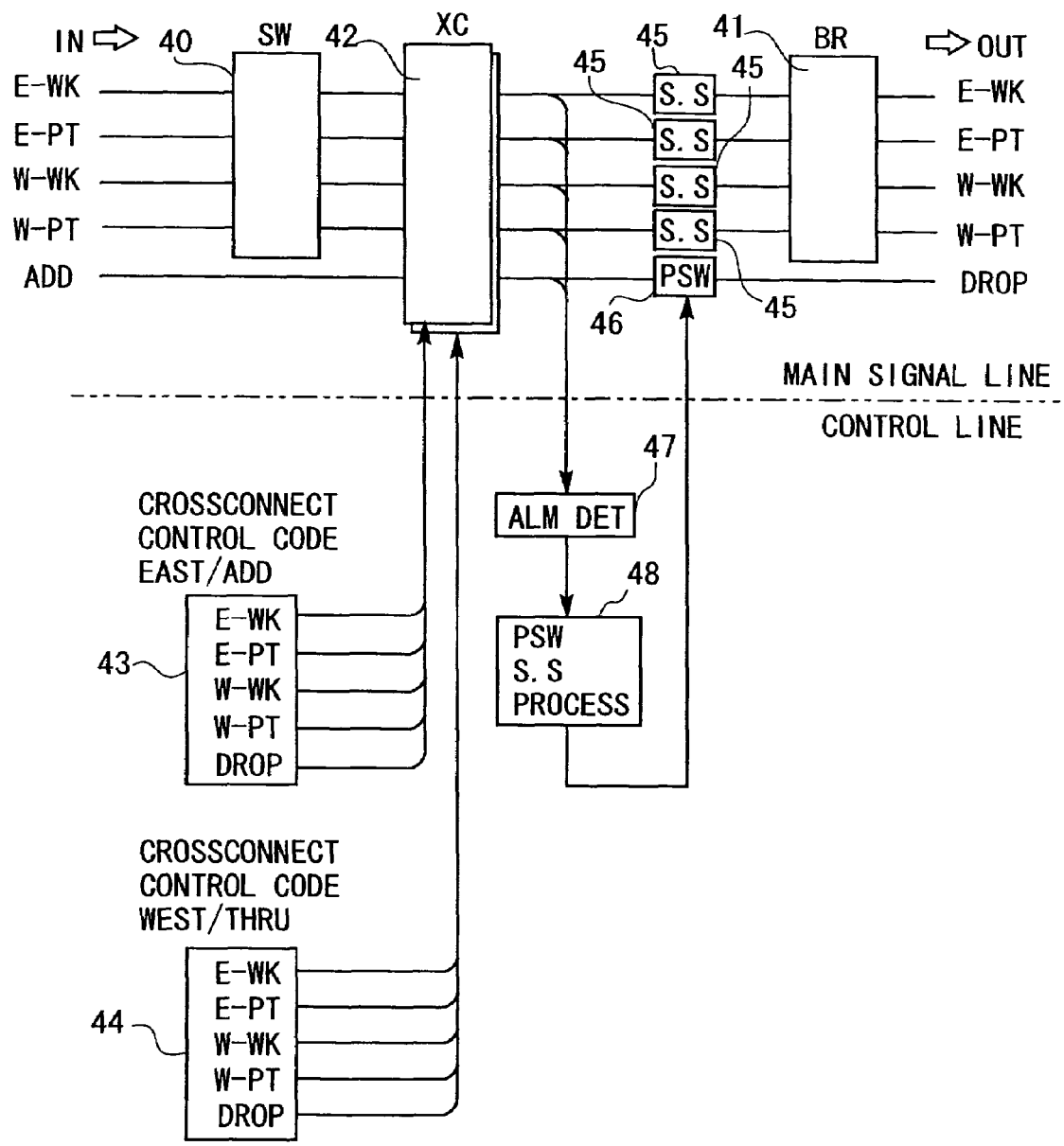
FIG. 24 is a view showing an example of a cross-connect process and a working traffic/protection traffic switchover circuit in a conventional terminal relay device.

FIG. 24 shows an example of a circuit for the cross-connect process and the working traffic/protection traffic switchover process in the conventional terminal relay device. This circuit includes a main signal line circuit and a control line circuit.

As shown in FIG. 24, the main signal line circuit has a switch unit 40, a cross-connect processing unit 42, a service selector 45, a path switch 46 and a bridge unit 41. Further, the control line circuit has cross-connect control code setting units 43, 44, an alarm detection unit 47 and a path switch/service selector processing unit 48.

The switch unit 40 executes the Line APS process. Namely, the switch unit 40 makes a line-basis (OC-N basis) selection to gain a better line quality and performs the switchover between the working traffic line and the protection traffic line. Moreover, the switch unit 40 provides the same function as that of the receiving-side system block 5-1 shown in FIG. 11 when in the BLSR process.

The service selector 45 and the bridge unit 41 execute the BLSR process in the ring network. For example, if a fault occurs in a transmitting-side channel (E-WK) of the east-side working traffic line, the bridge 41 transmits a signal to be transmitted to the transmitting-side channel (E-WK) of the east-side working traffic line, via a transmitting channel of a west-side protection traffic line (W-PT). This process is the same as the process of the system block 15-1 shown in FIG. 11 in the first embodiment.

Herein, the service selector 45 switches over, among the input-side signals, a through-signal (a signal of the higher-level side configuring the BLSR, i.e., the signal on the east side or west side) and an add signal, i.e., the signal inputted to the terminal relay device from a second BLSR. The second BLSR connotes another BLSR connected to a focused BLSR in the network including a plurality of BLSRs.

FIG. 24 shows the input signals (indicated by the arrow IN) such as an east-side working traffic line (E-WK) signal, an east-side protection traffic line (E-PT) signal, a west-side working traffic line (W-WK) signal, a west-side protection traffic line (W-PT) signal and an add (ADD) signal. Further, a drop (DROP) signal is given as an output signal. Generally, the add signal is a signal added to a higher-level network from a lower-level network, while the drop signal is outputted to the lower-level network from the higher-level network.

Moreover, the add signal and the drop signal are combined for connecting the two BLSRs. That is, in a case where a path is built up by the two BLSRs, the signal dropped from the first BLSR is added to the second BLSR. In this case, the terminal relay device accepting the add signal in the second BLSR switches over a to-be-saved channel to the add (ADD) signal from the through-signal (any one of the signals such as E-WK, E-PT, W-WK, W-PT). As described above, the service selector 45 executes the switchover process between the through-signal and the add signal.

Further, the bridge unit 41 provides the same function as that of the transmitting-side system block 15-1 in FIG. 11.

The path switch 46 makes a channel-basis selection to gain a better line quality (e.g., a side with no occurrence of alarm) between the working traffic line and the protection traffic line, and effects dropping (outputting to a lower-level interface).

The cross-connect control code setting units 43, 44 control the cross-connect processing circuit 42 in accordance with the user setting. Specifically, the cross-connect control code setting units 43, 44 input, to the cross-connect processing circuit 42, an instruction signal for connecting the input-side terminal to the output-side terminal of the cross-connect processing circuit 42.

Note that the cross-connect control code setting unit 43 selects and allocates any one of the signal coming from the east side and the add signal to the output channel after being cross-connected. Based on this allocation, the cross-connect processing circuit 42 cross-connects the input-side signal and the output-side signal.

Moreover, the cross-connect control code setting unit 44 executes the same setting upon the signal coming from the west side and the through-signal. Thus, the circuit in FIG. 24 allocates, to the channel after the cross-connect process, the from-the-east signal/add signal, and the from-the-west signal/through-signal, independently.

The alarm detection unit 47 detects an alarm from the main signal. The path switch/service selector processing unit 48 controls the service selector 45 or the path switch 46 according to the alarm detected by the alarm detection unit 47.

Example 4-1

Figure 25:
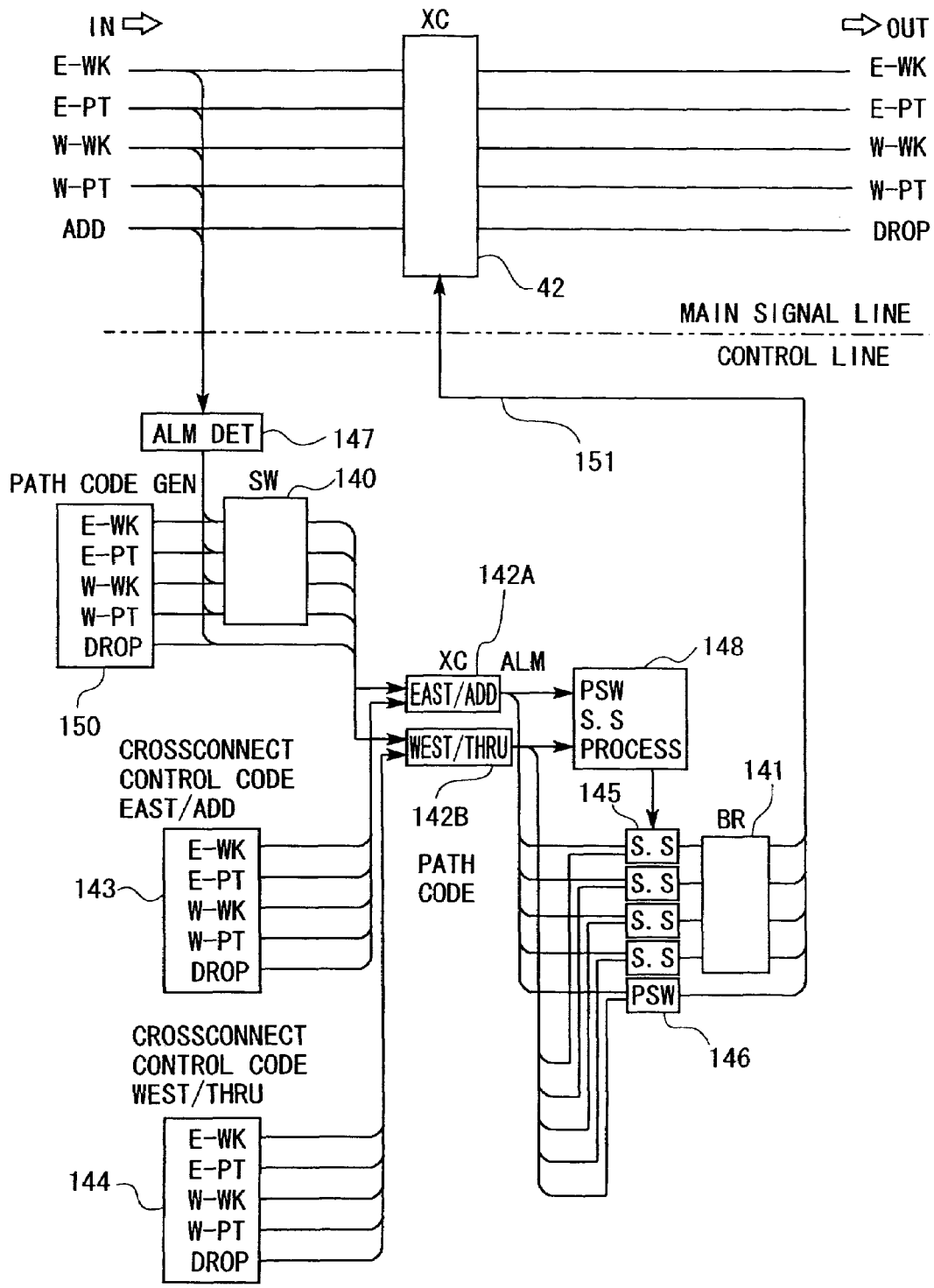
FIG. 25 is a view of a configuration of the terminal relay device according to an example 4-1 of the present invention.

FIG. 25 shows a configuration of a terminal relay device according to an example 4-1 of the present invention. As shown in FIG. 25, this terminal relay device, as compared with the case (configuration) in FIG. 24, takes a configuration in which the control line circuit includes component other than the cross-connect processing circuit 42.

To be specific, this control line circuit includes an alarm detection unit 147 for detecting an alarm on the main signal, a path code generation unit 150 for generating a path code for distinguishing between the respective signal channels, a switch unit 140 executes, before the cross-connect process, the working traffic line/protection traffic line switchover with respect to transmission paths corresponding to the higher-level lines (e.g., the east-side working traffic line, the east-side protection traffic line, the west-side working traffic line and the west-side protection traffic line in the case of the BLSR) among the transmission paths for transmitting the path codes, cross-connect processing circuits 142A, 142B for executing the cross-connect process with respect to the transmission paths for transmitting the path codes, a cross-connect control code setting unit 143 for controlling the cross-connect processing circuit 142A in accordance with the user setting, a cross-connect control code setting unit 144 for controlling the cross-connect processing circuit 142B in accordance with the user setting, a service selector 145 for switching over a path code corresponding to the through-signal and a path code corresponding to the add signal in the transmission paths for transmitting the path codes after the cross-connect process, a path switch 146 for selecting a transmission path exhibiting a better line quality (with no occurrence of alarm) in the transmission path for the working traffic path code and the transmission path for the protection traffic path code after the cross-connect process and effecting the drop, and a path switch/service selector processing unit 148.

Among these components, the path code generation unit 150 generates a path code corresponding to an input channel of the main signal. The path code is a code for individually identifying the input channel of the main signal. For example, the terminal relay device based on the OC-48 level uses the path codes for identifying 48 channels. Further, the terminal relay device containing ten sets of OC-48 levels employs the path codes for identifying 480 channels.

A bit count (number of bits) of the path codes, which enable the channels to be identified, may suffice. For example, 9 bits ($2^9=512$) as a bit count may suffice for identifying 480 channels.

The path code generation unit 150 generates the path code for identifying each channel by use of a bit pattern as a combination of 0 and 1. Note that among those respective channels, E-WK, E-PT, W-WK, W-PT and DROP are exemplified in FIG. 25.

In the example 4-1, the control line circuit has transmission paths using these bit patterns for the respective channels. Namely, for instance, in the 480-channel terminal relay device, there are built up the circuits using totally 4320 bits for all the channels, wherein each channel requires 9 bits.

The switch unit 140, in the same way as the switch unit 40 in FIG. 24 does, makes a selection to gain a better line quality with respect to the path codes between the working traffic line and the protection traffic line, thereby switching over the transmission path corresponding to the path code. Alternatively, the switch unit 140, when in the BLSR process, provides the same function as that of the receiving-side system block 5-1 shown in FIG. 11, and switches over the transmission path corresponding to the path code. Further, a result of the detection made by the alarm detection unit 147 is switched over as in the case of the path code.

The functions of the cross-connect control code setting units 143, 144 are the same as those of the preceding cross-connect control code setting unit 43, 44 shown in FIG. 24.

Further, in the cross-connect processing circuits 142A and 142B, the cross-connect processing target components are the path-code related transmission path and the alarm-detection-result related transmission path, however, the processing content of these circuits 142A, 142B is the same as that of the normal cross-connect processing circuit 42.

Moreover, as for the service selector 145, the path switch 146 and the bridge unit 141, the processing contents thereof are the same as those of the service selector 45, the path switch 46 and the bridge unit 41 in FIG. 24 except such a point that the processing target component is the path-code related transmission path.

For example, the service selector 145 executes the Add/Through switchover with respect to the path code. Moreover, the path switch 146 executes the path-code based cross-connect process with respect to the east/west sides.

The path switch/service selector processing unit 148 generates switchover signals for the service selector 145 and the path switch 146.

Thus, the path code identifying the channel of each input signal is subjected to the cross-connect process including the Linear ADM process or the BLSR process by the control line circuit shown in FIG. 25. Then, a result of the cross-connect process is outputted and is inputted (as a signal 151) to the cross-connect processing circuit 42.

This signal 151 contains (information about) the transmission path having a bit count that identifies each channel. Besides, this transmission path corresponds to the output-side channel of the cross-connect processing circuit. Accordingly, the signal 151 represents a relation between the post-cross-connecting channel and the pre-cross-connecting channel that should be cross-connected to this signal. Namely, the cross-connect processing circuit 42 may convert, based on this signal 151, the channel of the input signal into the channel of the output signal.

Thus, the signal having the bit count simply identifying the channel is subjected to the execution of the cross-connect process including the Linear ADM process or the BLSR process, thereby making it possible to obtain the setting signal for the cross-connect processing circuit 42 in the main signal line. Hence, in the control line circuit separated from the main signal line, the Linear ADM process or the BLSR process can be substantially executed by use of the path code simulating the main signal.

Example 4-2

Figure 26:
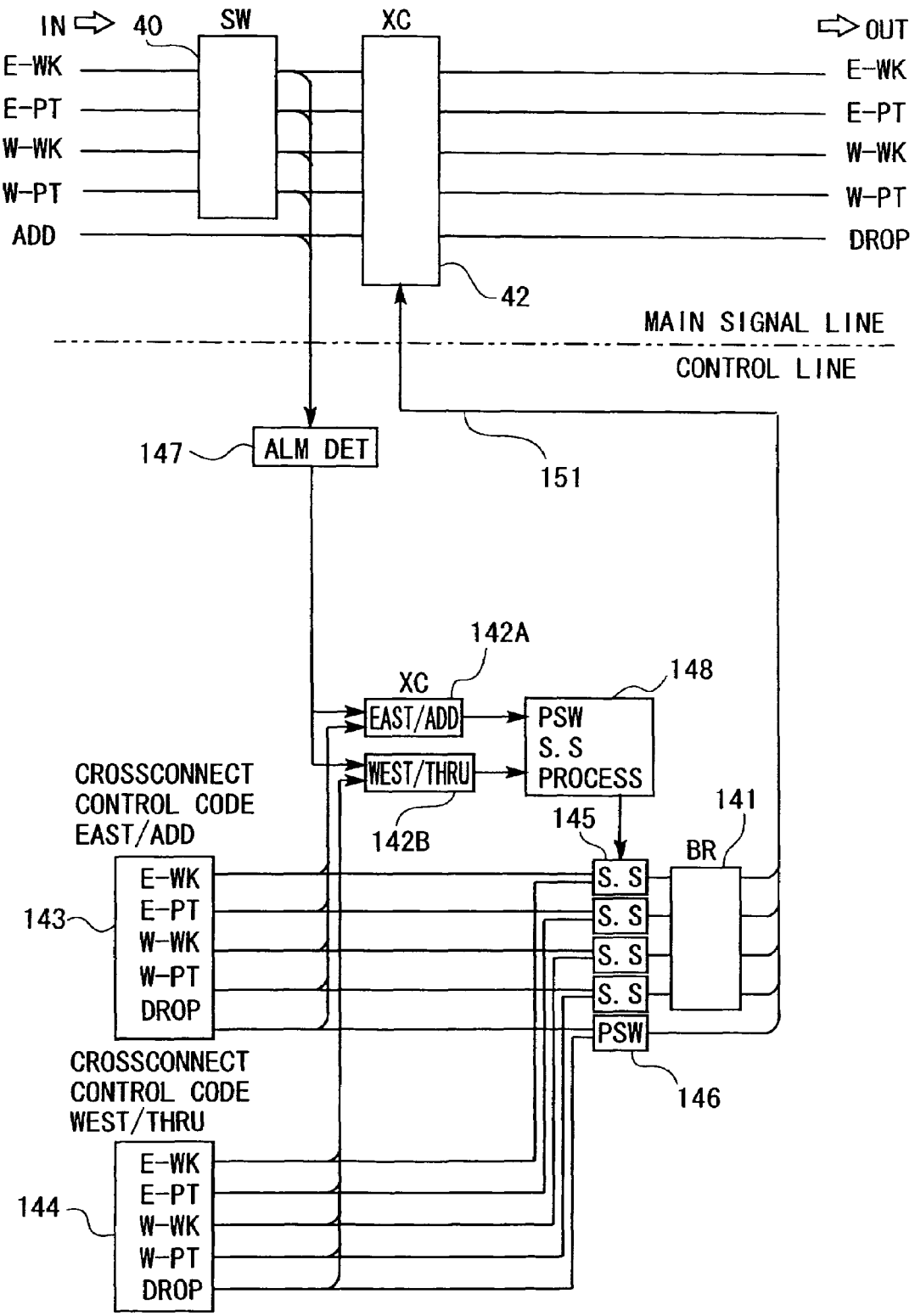
FIG. 26 is a view of a configuration of the terminal relay device according to an example 4-2 of the present invention.

FIG. 26 shows a configuration of a terminal relay device according to an example 4-2 of the present invention. The explanation in the example 4-1 is about the cross-connect process including the Linear ADM process or the BLSR process, which is executed substantially by use of the path code simulating the main signal.

In FIG. 26, a difference from the example 4-1 is such a point that the switch unit 40 is included in the main signal line circuit as compared with the example 4-1 in FIG. 25. Other constructions and operations are the same as those in the example 4-1. This being the case, the same components are marked with the same symbols and numerals, and their explanations are omitted.

In the circuit in FIG. 26, the switch unit 40 is employed in the main signal line circuit. Accordingly, the alarm detection unit 147 may detect the alarm from the main signal after executing the Linear ADM process. Hence, the control line circuit side has no necessity of executing the Linear ADM process corresponding to the process of the switch unit 40. Accordingly, as compared with the case (configuration) in FIG. 25, the path code generation unit 150 and the switch unit 140 are excluded from the control line circuit in FIG. 26. To be specific, in the circuit in this example 4-2, control codes (the codes each indicating which input channel is allocated to the post-cross-connecting channel) of the cross-connect control code setting unit 143 and 144 are inputted to the cross-connect processing circuit 42 via the service selector 145 and the bridge unit 141 or the path switch 146.

As discussed above, the functions of this circuit are the same as those of the circuit in FIG. 25 except such a point that the switch unit 40 is provided in the main signal line circuit and the path code generation unit 150 is eliminated.

Other Modified Examples

The embodiments discussed above have given the examples where the present invention is embodied on the SONET/SDH. The embodiment of the present invention is not, however, limited to the SONET/SDH. Namely, the present invention can be embodied in the general type of relay devices each having the working traffic/protection traffic switchover function and the cross-connect processing function.

INDUSTRIAL APPLICABILITY

The present invention can be applied to the relay devices each having the working traffic/protection traffic switchover function and the cross-connect processing function in the network such as the SONET/SDH, etc.

OTHERS

The disclosures of international application PCT/JP2003/004011, filed on Mar. 28, 2003 including the specification, drawings and abstract are incorporated herein by reference.

What is claimed is:

1. A terminal relay device in a network, comprising:
a cross-connect processing circuit executing a cross-connect process including line setting on a network, having a plurality of input-side interfaces and a plurality of output-side interfaces;
a first transmission path switchover unit switching over a working traffic transmission path providing a line on the network and a protection traffic transmission path serving as a substitute transmission path for said working traffic transmission path on an input side of said cross-connect processing circuit;
a second transmission path switchover unit switching over a working traffic transmission path providing a line on the network and a protection traffic transmission path serving as a substitute transmission path for said working traffic transmission path on an output side of said cross-connect processing circuit, said first transmission path switchover unit and said second transmission path switchover unit each having an input-side interface and an output-side interface;
a plurality of slot units, into which interface units connectable to the transmission path on the network or interface units connectable to a low-order network to be connected to the network are inserted, said each of slot unit receiving a transmitting terminal or a receiving terminal on said interface unit connectable to the network or the low-order network;
a first selection unit selectively connecting the receiving terminal on said interface unit inserted into any one of said slot units to said input-side interface of said first transmission path switchover unit;
a second selection unit connecting said output-side interface of said first transmission path switchover unit to said input-side interface of said cross-connect processing circuit;
a third selection unit selectively connecting said output-side interface of said cross-connect processing circuit to said input-side interface of said second transmission path switchover unit; and
a fourth selection unit connecting said output-side interface of said second transmission path switchover unit to said transmitting terminal on said interface unit inserted into any one of said slot units.

2. A terminal relay device according to claim 1, wherein said second selection unit connects said receiving terminal connected via said first selection unit and said first transmission path switchover unit, to said input-side interface of said cross-connect processing circuit, said input-side interface being set corresponding to a slot position into which said interface including said receiving terminal is inserted.

3. A terminal relay device according to claim 1, wherein said third selection unit connects said transmitting terminal connected via said second transmission path switchover unit and said fourth selection unit, to said output-side interface of said cross-connect processing circuit, said output-side interface being set corresponding to a slot position into which said interface including said transmitting terminal is inserted.

4. A terminal relay device according to claim 1, further comprising a quality judging unit judging a transmission quality on the network,
wherein said first transmission path switchover unit or said second transmission path switchover unit switches over said working traffic transmission path and said protection traffic transmission path in accordance with the transmission quality.

5. A terminal relay device according to claim 1, wherein the network is a SONET/SDH optical network.

6. A terminal relay device according to claim 1, wherein the network includes a configuration of establishing a one-to-one connection of said terminal relay device to other terminal relay device, a configuration of establishing a linear connection to a train of other terminal relay devices, or a configuration of establishing a ring connection to a plurality of other terminal relay devices.

7. A terminal relay device according to claim 1, wherein said terminal relay device configures UPSR (Uni-directional Path Switched Ring) in the SONET/SDH optical network.

8. A terminal relay device according to claim 1, wherein said terminal relay device configures BLSR (Bi-directional Line Switched Ring) in the SONET/SDH optical network.

9. A terminal relay device connected to a network including a first ring transmission path having a working traffic transmission path in a first direction and a protection traffic transmission path in the first direction, and a second ring transmission path having a working traffic transmission path in a second direction and a protection traffic transmission path in the second direction, said relay device comprising:
a cross-connect processing circuit executing a cross-connect process of a communication channel on the network;
a first transmission switchover unit switching over a working traffic transmission path from the first direction and a protection traffic transmission path from the second direction that serves as a substitute transmission path for said working traffic transmission path on a receiving side from the network with respect to said cross-connect processing circuit; and
a second transmission switchover unit switching over a working traffic transmission path toward the first direction and a protection traffic transmission path toward the second direction that serves as a substitute transmission path for said working traffic transmission path on a transmitting side toward the network with respect to said cross-connect processing circuit, said first transmission path switchover unit including:

channel information detecting unit detecting channel information distinguishing each communication channel among communication channels included in said working traffic transmission path;

channel identifying unit identifying, based on the channel information, a communication channel contained in said protection traffic transmission path, which corresponds to the communication channel used in said working traffic transmission path; and a switch unit switching over the communication channel of said working traffic transmission path to the communication channel of said protection traffic transmission path, which is identified based on said channel identifying unit.

10. A terminal relay device according to claim 9, further comprising:

a third transmission path switchover unit switching over a working traffic transmission path from the second direction and a protection traffic transmission path from the first direction that serves as a substitute transmission path for said working traffic transmission path on a receiving side from the network with respect to said cross-connect processing circuit; and a fourth transmission path switchover unit switching over a working traffic transmission path toward the second direction and a protection traffic transmission path toward the first direction that serves as a substitute transmission path for said working traffic transmission path on a transmitting side toward the network with respect to said cross-connect processing circuit, said third transmission path switchover unit including:

channel information detecting unit detecting channel information distinguishing each communication channel among communication channels included in said working traffic transmission path;

channel identifying unit identifying, based on the channel information, a communication channel contained in said protection traffic transmission path, which corresponds to the communication channel used in said working traffic transmission path; and a switch unit switching over the communication channel of said working traffic transmission path to the communication channel of said protection traffic transmission path, which is identified based on said channel identifying unit.

11. A terminal relay device according to claim 9, wherein said working traffic transmission path and said protection traffic transmission path respectively have different transmission mediums in said first ring transmission path, and said working traffic transmission path and said protection traffic transmission path respectively have different transmission mediums in said second ring transmission path.

12. A terminal relay device comprising:

a cross-connect processing circuit executing a cross-connect process including line setting on a network; and a control circuit controlling said cross-connect processing circuit, said control circuit including:

a control transmission path including a plurality of channels corresponding to transmission paths of the network;

a switchover unit switching over said channel in said control transmission path;

a setting unit setting, in said cross-connect processing circuit, a corresponding relation between a channel after being switched over by said switchover unit and a channel before being switched over by said switchover unit; and an identifying information generation unit generating a piece of identifying information for identifying said channel, and inputting the identifying information to a corresponding channel of said control transmission path;

wherein said control transmission path includes a first control transmission path including a plurality of channels corresponding to working traffic transmission paths included in the network, and a second control transmission path serving as a substitute transmission path for said first control transmission path, corresponding to protection traffic transmission path included in the network, and said switchover unit switches over said channel between said first control transmission path and said second control transmission path based on the identifying information.

13. A terminal relay device according to claim 12, wherein said control transmission path further includes a third transmission path including a channel on the side of entering the network, and a fourth transmission path including a channel on the side of exiting the network, said switchover unit includes an input-side switchover unit switching over the channel among said first control transmission path, said second control transmission path and said third transmission path on the input side to said switchover unit, and an output-side switchover unit switching over said channel among said first control transmission path, said second control transmission path and said fourth transmission path on the output side to said switchover unit.

14. A terminal relay device according to claim 12, wherein said terminal relay device configures UPSR (Uni-directional Path Switched Ring) in the SONET/SDH optical network.

15. A terminal relay device according to claim 12, wherein said terminal relay device configures BLSR (Bi-directional Line Switched Ring) in the SONET/SDH optical network.

16. A relay method in a network including a first ring transmission path having a working traffic transmission path in a first direction and a protection traffic transmission path in the first direction, and a second ring transmission path having a working traffic transmission path in a second direction and a protection traffic transmission path in the second direction, the network including a cross-connect processing circuit executing a cross-connect process of a communication channel on the network, said method comprising:

a first switchover step switching over a working traffic transmission path from the first direction and a protection traffic transmission path from the second direction that serves as a substitute transmission path for said working traffic transmission path on a receiving side from the network with respect to said cross-connect processing circuit; and a second switchover step switching over a working traffic transmission path toward the first direction and a protection traffic transmission path toward the second direction that serves as a substitute transmission path for said working traffic transmission path on a transmitting side toward the network with respect to said cross-connect processing circuit, said first switchover step including:

a channel information detecting step detecting channel information distinguishing each communication channel among communication channels included in said working traffic transmission path;

a step retaining the channel information;

a communication channel identifying step identifying, based on the channel information, a communication channel contained in said protection traffic transmission path, which corresponds to the communication channel used in said working traffic transmission path; and a step switching over the communication channel of said working traffic transmission path to the communication channel of said protection traffic transmission path, which is identified based on said channel information.

17. A relay method according to claim 16, further comprising:

a plurality of third transmission path switchover steps of switching over a working traffic transmission path from the second direction and a protection traffic transmission path from the first direction that serves as a substitute transmission path for said working traffic transmission path on a receiving side from the network with respect to said cross-connect processing circuit; and a plurality of fourth transmission path switchover step switching over a working traffic transmission path toward the second direction and a protection traffic transmission path toward the first direction that serves as a substitute transmission path for said working traffic transmission path on a transmitting side toward the network with respect to said cross-connect processing circuit, said third transmission path switchover step including:

a channel information detecting step detecting channel information distinguishing each communication channel among communication channels included in said working traffic transmission path;

a channel identifying step identifying, based on the channel information, a communication channel contained in said protection traffic transmission path, which corresponds to the communication channel used in said working traffic transmission path; and a step switching over the communication channel of said working traffic transmission path to the communication channel of said protection traffic transmission path, which is identified based on said channel identifying step.

* * * * *